US008849934B2

(12) United States Patent
Mandre

(10) Patent No.: US 8,849,934 B2
(45) Date of Patent: *Sep. 30, 2014

(54) INSTANT MESSAGING ACTIVITY NOTIFICATION

(71) Applicant: Microsoft Corporation, Redmond, WA (US)

(72) Inventor: Indrek Mandre, Tallinn (EE)

(73) Assignee: Skype, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/836,562

(22) Filed: Mar. 15, 2013

(65) Prior Publication Data

US 2013/0205226 A1  Aug. 8, 2013

Related U.S. Application Data

(63) Continuation of application No. 12/004,093, filed on Dec. 19, 2007, now Pat. No. 8,417,784.

(30) Foreign Application Priority Data

Feb. 20, 2007 (GB) .................................. 0703276.6

(51) Int. Cl.
*G06F 15/16* (2006.01)
*H04L 12/58* (2006.01)
*H04L 29/08* (2006.01)

(52) U.S. Cl.
CPC .............. *H04L 51/04* (2013.01); *H04L 51/043* (2013.01); *H04L 67/22* (2013.01); *H04L 12/5815* (2013.01); *H04L 12/581* (2013.01)
USPC ........................... 709/206; 709/204; 709/205

(58) Field of Classification Search
CPC ....... H04L 51/04; H04L 51/043; H04L 67/22; H04L 12/581; H04L 12/5815
USPC .................................................. 709/204–206
See application file for complete search history.

(56) References Cited

U.S. PATENT DOCUMENTS

| 5,880,731 A | 3/1999 | Liles et al. |
| 6,301,609 B1 | 10/2001 | Aravamudan et al. |

(Continued)

FOREIGN PATENT DOCUMENTS

| CN | 101611602 | 12/2009 |
| EP | 1845697 | 10/2007 |

(Continued)

OTHER PUBLICATIONS

Jennings, et al.,' "A Study of Internet Instant Messaging and Chat Protocols", Network, IEEE vol. 20, Issue 4, Jul. 2006, pp. 16-21.

(Continued)

*Primary Examiner* — Chau Le
(74) *Attorney, Agent, or Firm* — Sonia Cooper; Jim Ross; Micky Minhas

(57) ABSTRACT

User activity is communicated in a messaging system. Communication is performed by monitoring an input region displayed to a first user of the messaging system in a client executed at a user terminal of the first user; responsive to receiving a user activated input at the input region, analyzing the input and using the analysis to match the input to a type of user activity from a predetermined set of user activities; and transmitting a message comprising data representing the type of user activity from the user terminal of the first user to a user terminal of at least one other user of the messaging system over a communications network.

20 Claims, 19 Drawing Sheets

(56) References Cited

U.S. PATENT DOCUMENTS

| | | | |
|---|---|---|---|
| 6,349,327 | B1 | 2/2002 | Tang et al. |
| 6,519,639 | B1 | 2/2003 | Glasser et al. |
| 6,631,412 | B1 | 10/2003 | Glasser et al. |
| 7,685,204 | B2 | 3/2010 | Rogers |
| 7,996,775 | B2 | 8/2011 | Cole et al. |
| 2003/0046421 | A1 | 3/2003 | Horvitz et al. |
| 2003/0131055 | A1 | 7/2003 | Yashchin et al. |
| 2003/0154251 | A1 | 8/2003 | Manabe et al. |
| 2003/0218631 | A1 | 11/2003 | Malik |
| 2004/0078441 | A1 | 4/2004 | Malik et al. |
| 2004/0162877 | A1 | 8/2004 | Van Dok et al. |
| 2004/0179038 | A1 | 9/2004 | Blattner et al. |
| 2005/0005008 | A1 | 1/2005 | Glasser et al. |
| 2005/0027669 | A1 | 2/2005 | Day et al. |
| 2005/0027839 | A1 | 2/2005 | Day et al. |
| 2005/0044143 | A1 | 2/2005 | Zimmermann et al. |
| 2006/0005133 | A1 | 1/2006 | Lyle et al. |
| 2006/0170945 | A1 | 8/2006 | Bill |
| 2006/0206454 | A1 | 9/2006 | Forstall et al. |
| 2006/0242232 | A1 | 10/2006 | Murillo et al. |
| 2006/0282386 | A1 | 12/2006 | Szeto et al. |
| 2007/0005694 | A1 | 1/2007 | Popkin et al. |
| 2008/0148154 | A1 | 6/2008 | Burrell et al. |
| 2008/0153459 | A1 | 6/2008 | Kansal et al. |
| 2008/0201438 | A1 | 8/2008 | Mandre |
| 2009/0013265 | A1 | 1/2009 | Cole et al. |
| 2012/0011210 | A1 | 1/2012 | Cole et al. |

FOREIGN PATENT DOCUMENTS

| | | |
|---|---|---|
| WO | WO-2004049182 | 6/2004 |
| WO | WO-2005009019 | 1/2005 |
| WO | WO-2009003735 | 1/2009 |

OTHER PUBLICATIONS

"Advisory Action", U.S. Appl. No. 12/004,093, (Aug. 18, 2011), 3 pages.

"Final Office Action", U.S. Appl. No. 12/004,093, (May 5, 2011), 22 pages.

"Final Office Action", U.S. Appl. No. 12/004,093, (Jul. 8, 2010), 14 pages.

"Foreign Notice of Allowance", EP Application No. 07872065.3, (May 2, 2011), 6 pages.

"Foreign Office Action", Chinese Application No. 200780051560.8, (Jul. 14, 2011), 8 pages.

"Foreign Office Action", CN Application No. 200780051560.8, (Jun. 1, 2012), 9 pages.

"Foreign Office Action", CN Application No. 200780051560.8, (Nov. 2, 2012), 8 pages.

"Foreign Office Action", EP Application No. 07872065.3, (Jun. 14, 2010), 7 pages.

"International Search Report and Written Opinion", PCT Application PCT/EP2008/053722, (Nov. 20, 2008), 13 pages.

"International Search Report and Written Opinion", PCT Application PCT/IB2007/004446, (Nov. 5, 2008), 14 pages.

"International Search Report", International Application No. PCT/IB2007/004446, (Nov. 5, 2008), 5 pages.

"Non Final Office Action", U.S. Appl. No. 12/004,093, (Oct. 25, 2010), 21 pages.

"Non Final Office Action", U.S. Appl. No. 12/004,093, (Feb. 4, 2010), 11 pages.

"Non-Final Office Action", U.S. Appl. No. 12/004,093, (Aug. 14, 2012), 10 pages.

"Non-Final Office Action", U.S. Appl. No. 12/004,106, (Oct. 27, 2010), 9 pages.

"Notice of Allowance", U.S. Appl. No. 12/004,093, (Dec. 4, 2012), 7 pages.

"Notice of Allowance", U.S. Appl. No. 12/004,093, (Mar. 14, 2012), 9 pages.

"Notice of Allowance", U.S. Appl. No. 12/004,106, (Mar. 31, 2011), 12 pages.

"Search Report", GB Application No. 0703276.6, (Mar. 19, 2007), 3 pages.

Rosenberg, J. "Advanced Instant Messaging Requirements for the Session Initiation Protocol (SIP)", *Internet Draft, Internet Engineering Task Force*, (Dec. 17, 2002), 8 pages.

Schulzrinne, H. "Indication of Message Composition for Instant Messaging", *RFC 3994, Internet Engineering Task Force*, (Jan. 2005), 26 pages.

"Non-Final Office Action", U.S. Appl. No. 13/173,644, Apr. 18, 2014, 12 pages.

"Final Office Action", U.S. Appl. No. 13/173,644, Jul. 18, 2014, 7 pages.

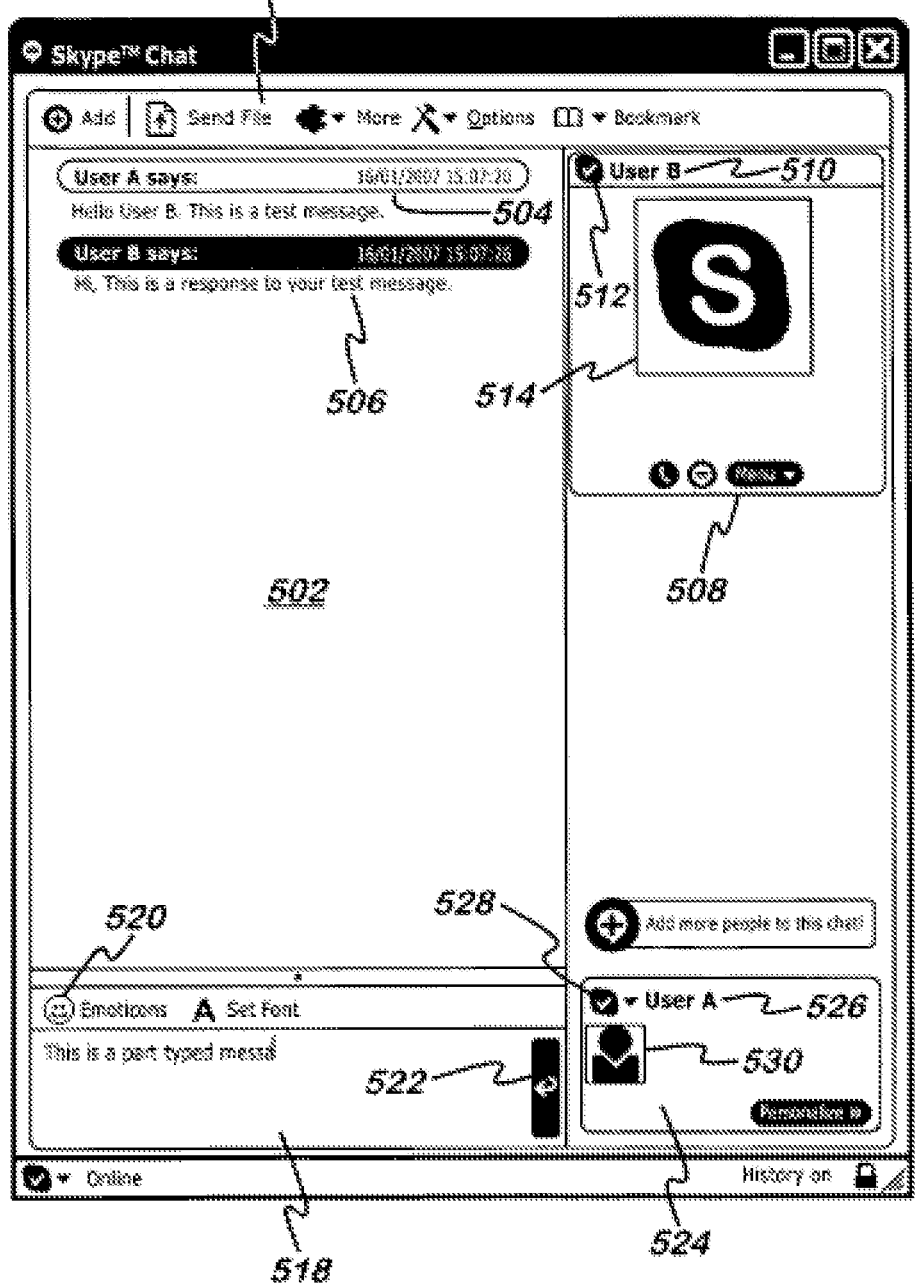

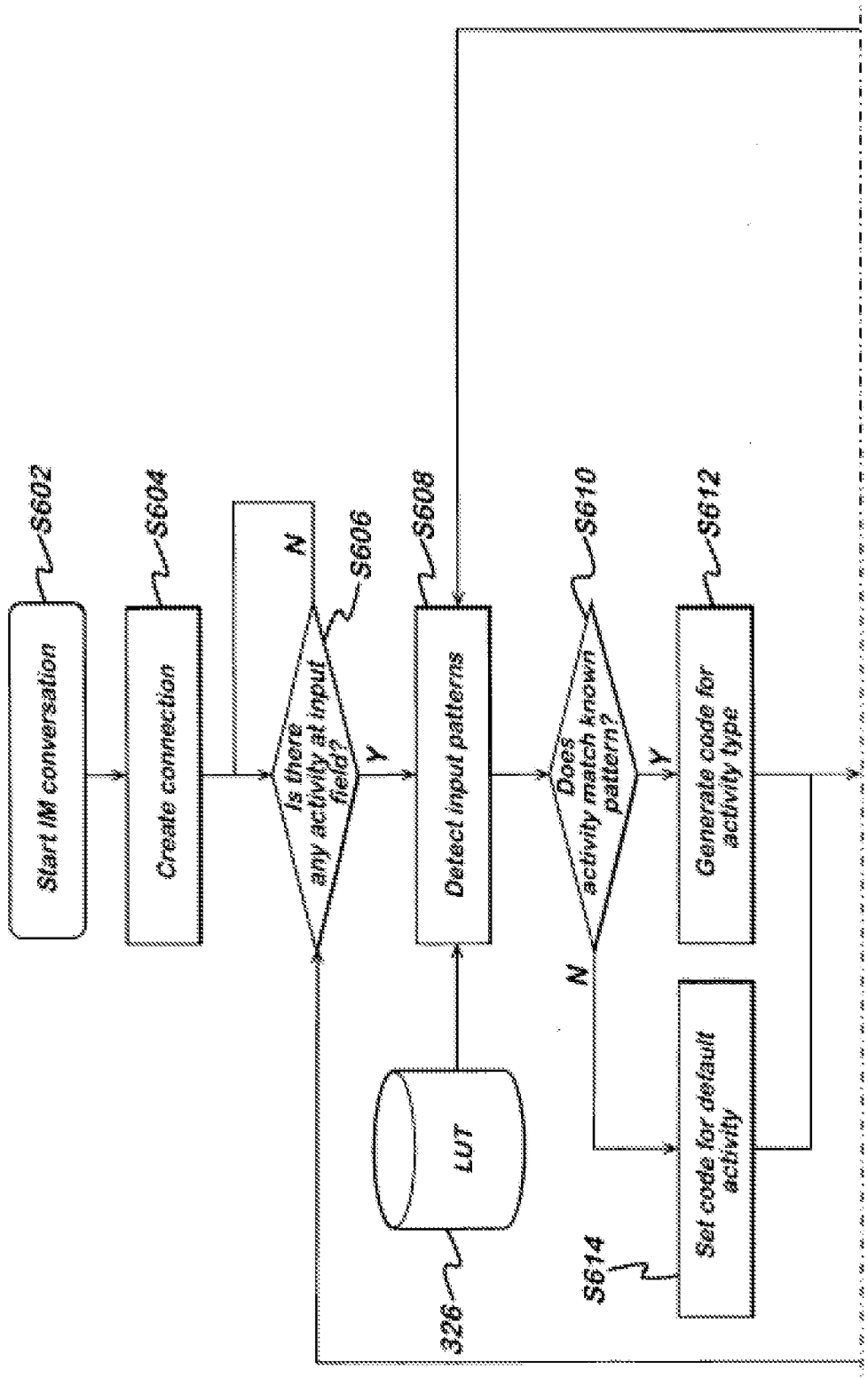

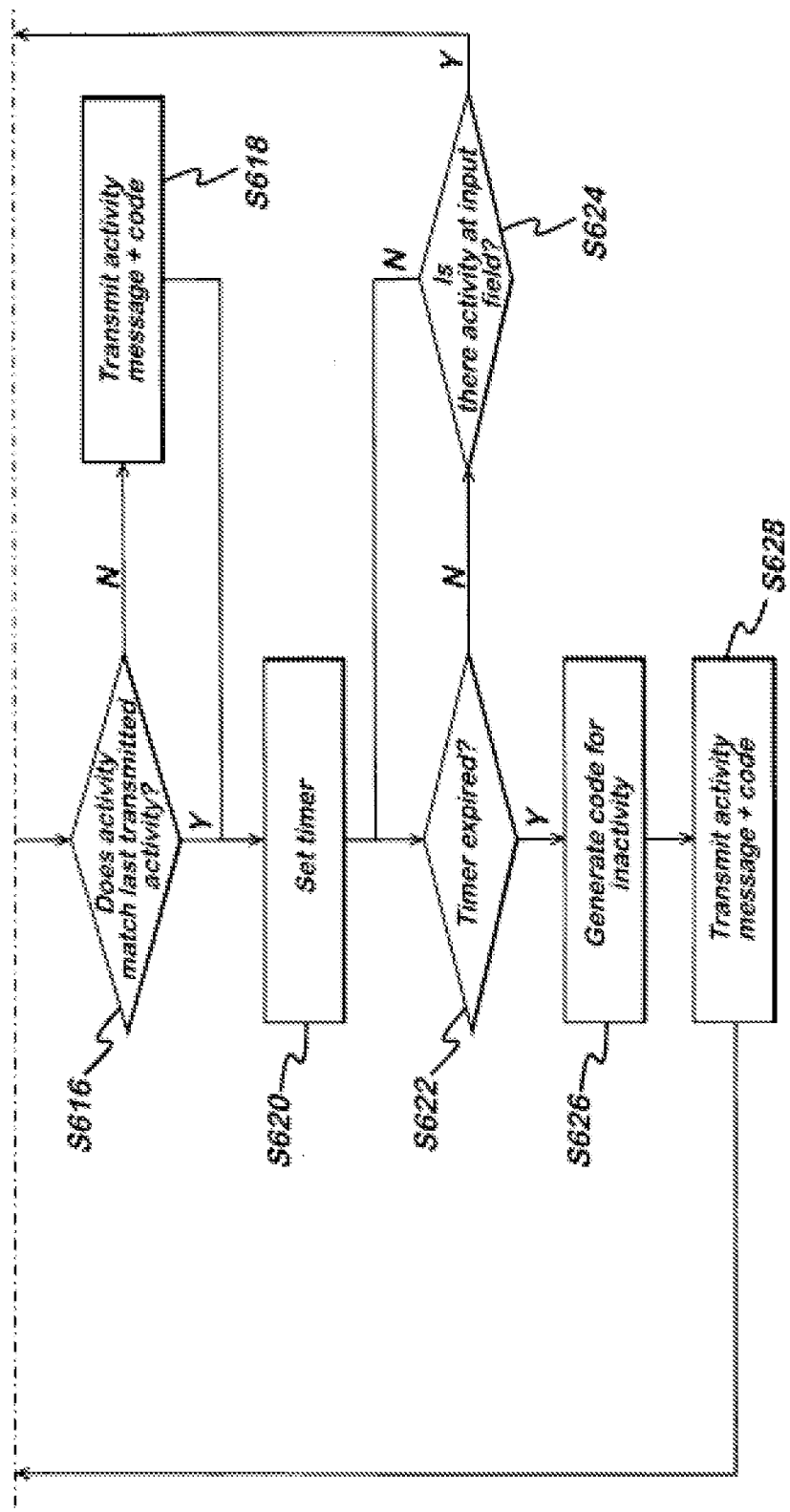
Fig. 6(contd.)

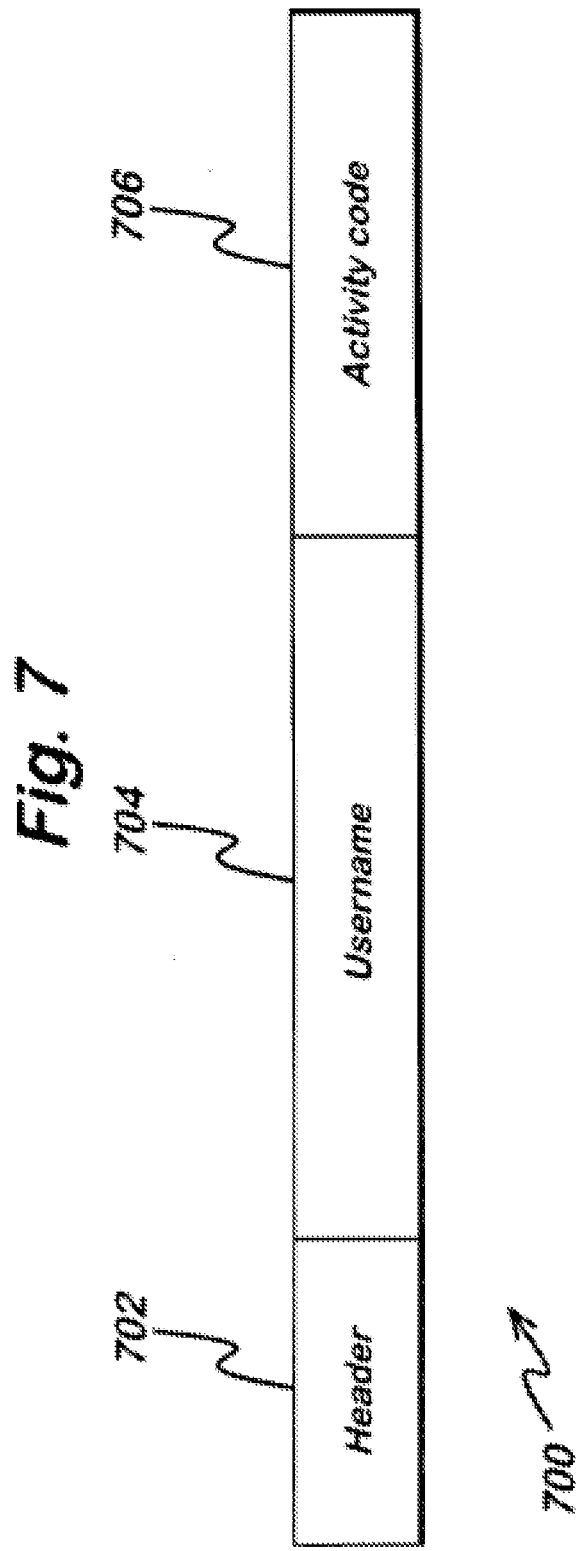

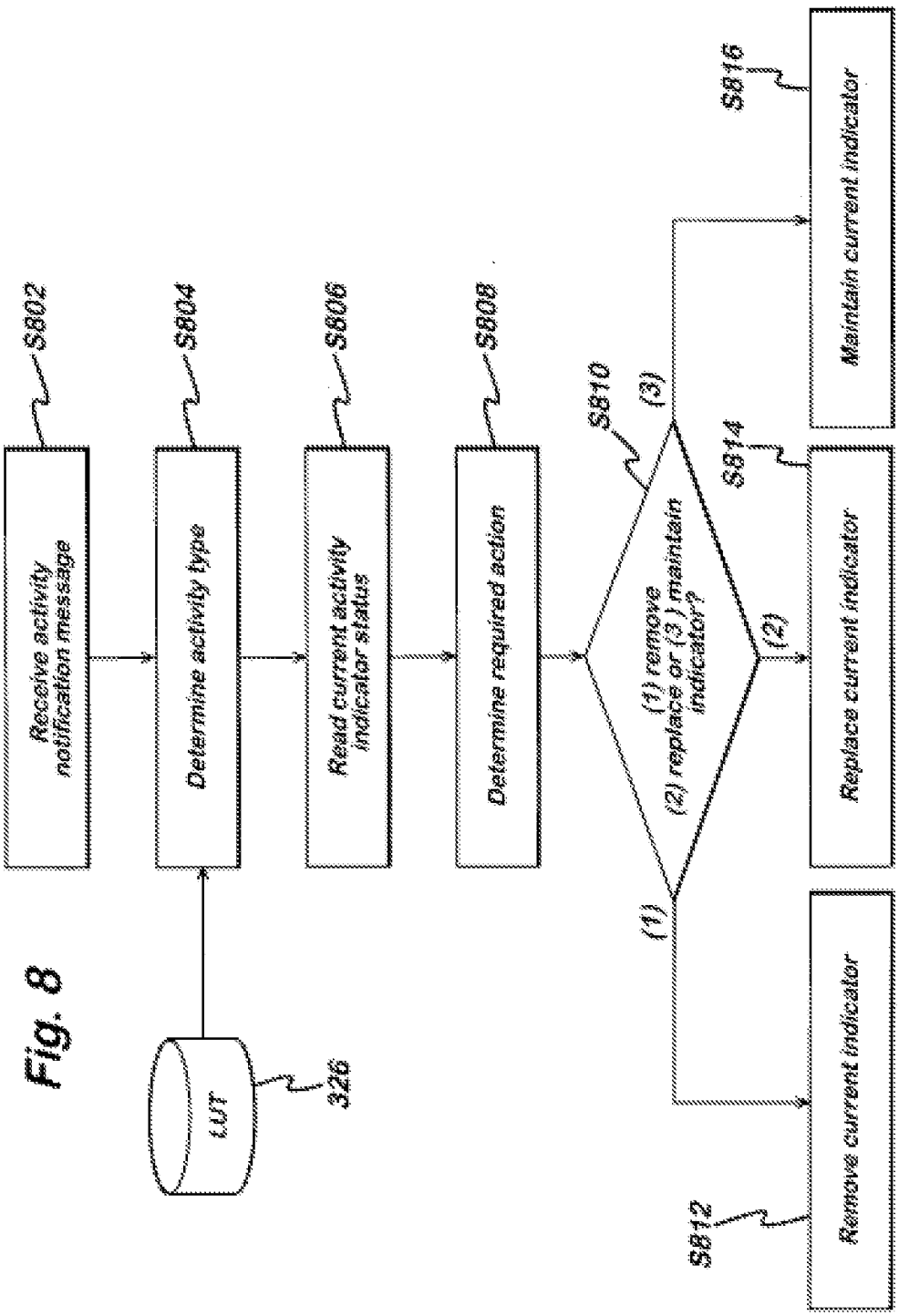

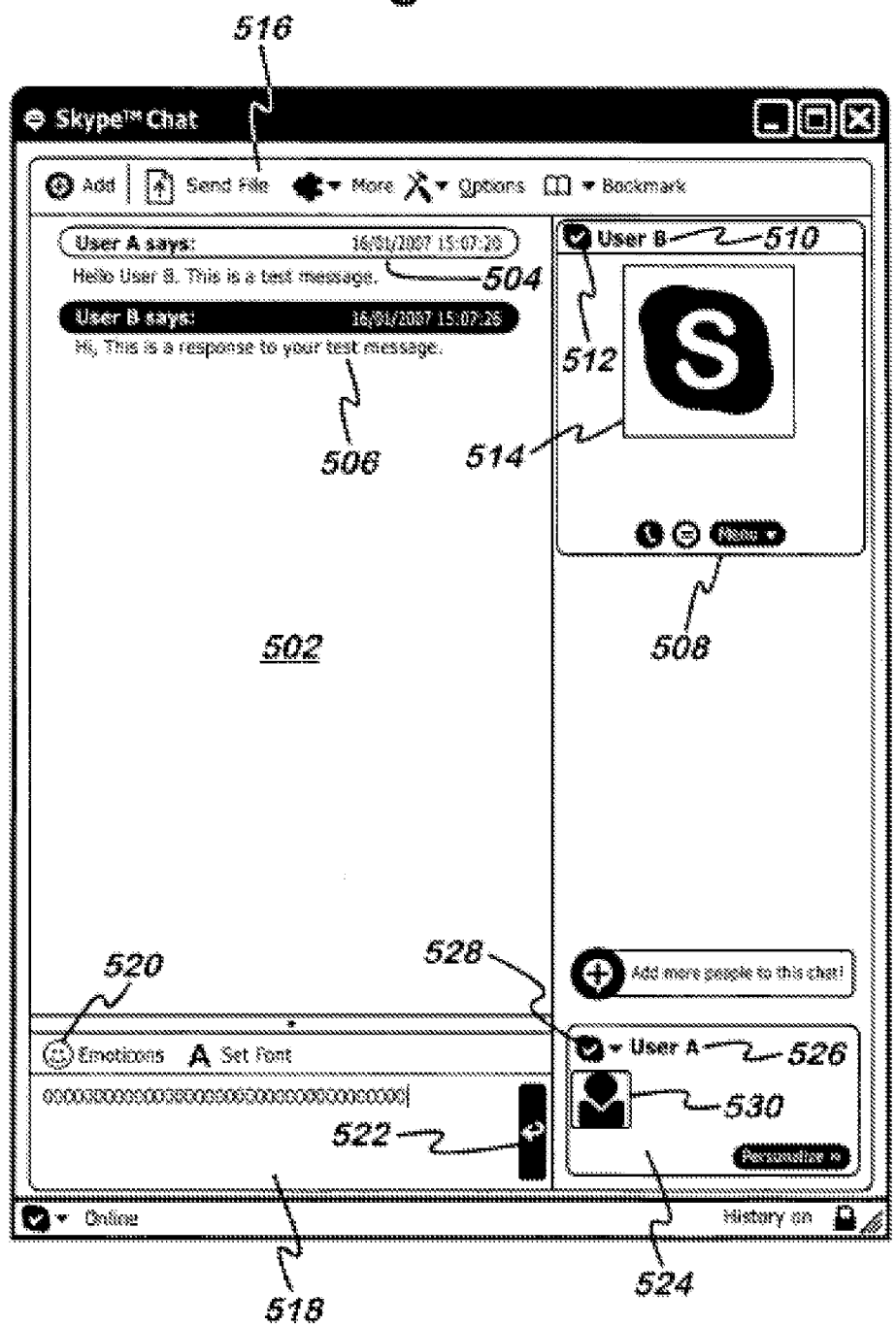

INSTANT MESSAGING ACTIVITY NOTIFICATION

RELATED APPLICATIONS

This application is a continuation of and claims priority under 35 U.S.C. §120 to U.S. patent application Ser. No. 12/004,093, filed on Dec. 19, 2007, which claims priority under 35 U.S.C. §119 or 365 to Great Britain, Application No. 0703276.6, filed Feb. 20, 2007. The above applications are incorporated herein by reference.

BACKGROUND

Instant messaging ("IM") is a popular form of computer-based communication in which text-based messages are exchanged between users in real-time. To use an instant messaging system, user terminals of the users must be connected to a communications network, such as the internet, and an instant messaging client application must be executed on the user terminal. The client application allows a user to initiate an instant messaging conversation with a remote user, by establishing a connection over the communications network. The user can then type a message and send it to the remote user (by pressing "enter" or actuating a "send" button), and the message is displayed in the user interface of the client of the remote user in near real-time (depending on network delays). The remote user may then subsequently type a reply and send it to the other user. The exchange of messages can continue in this way, in a similar form to face-to-face verbal conversation.

IM therefore has significant advantages over other text-based forms of electronic communication, such as email, in that it is much more interactive and therefore provides a much richer user experience. However, due to the fact that typing a message can take a significant period of time, a situation often arises where one of the users does not know that the other is typing a message, and therefore types his own message as well. This results in the two users frequently sending messages either at the same time or in close succession, thereby resulting in the IM equivalent of talking over each other. This can interrupt the flow of the conversation and make it stilted.

In order to improve the flow of the conversation, indicators are known that provide an indication to the participants of the IM conversation that one of them is typing. For example, when a user starts typing a messaging in an input field of an IM client a message is created and transmitted over the communications network to the remote user. In response to receiving the message, the client of the remote user displays a notification of the form "user X is typing". This provides a visual indication to the remote user that the user is typing, thereby prompting the remote user to wait until the message has been sent before typing his own message. This aids the flow of the conversation by preventing the users typing over each other.

A first method for controlling the display of an IM activity indicator is disclosed in U.S. Pat. No. 6,301,609. In this method, whenever activity from the keyboard is sensed in the IM client, a message is transmitted to the remote user. The reception of this message prompts the user interface of the remote user's client to display an activity notification. The client of the transmitting user starts a timer after sending the notification message, such that if further activity is not sensed within a predetermined time interval then a second message is sent indicating that activity has stopped. Reception of this second message prompts the user interface of the remote user's client to remove the activity notification.

A second method for controlling the display of an IM indicator is disclosed in U.S. Pat. No. 6,519,639. This discloses a method in which keyboard activity is sensed at the IM client, and an activity message is transmitted to the remote user. The reception of this message prompts the user interface of the remote user's client to display an activity notification. The client then waits for a predetermined time interval, and if there was any activity at the IM client within this time interval, then a further activity message is sent to the remote user. After the remote user's client has received an activity message, this also starts a timer, such that if a further activity message is not received when the timer expires, the activity notification displayed to the remote user is deleted.

An extension to the second method above is disclosed in U.S. Pat. No. 6,631,412, whereby the activity notification displayed to the remote user is deleted when the actual message comprising the information typed by the user is received at the remote user's terminal.

SUMMARY

Mere indication of whether input from the keyboard has occurred within a particular time interval does not accurately represent the actual user behaviour in an IM conversion. For example, a user often starts typing and then changes his mind and deletes a message. In the above-mentioned methods, this results in the remote user's client displaying an activity indicator, even though there is no message being prepared. The result of this is significant interruption to the flow of conversation, due to the delays involved when a remote user is waiting for a message that will never arrive. This is because the remote user's client is dependent on the timer to update the activity indicator. This results in user frustration, and makes the conversation stilted. A further problem with IM activity indication messages is that they are triggered regardless of whether the input was deliberate on the part of the user or not. Again, this will create expectation of a message on the part of the receiver, and hence frustration at the lack of a subsequent message.

There is therefore a need for a technique to address the aforementioned problems with IM activity notifications.

According to one aspect of the present invention there is provided a method of communicating user activity in a messaging system, comprising: monitoring an input region displayed to a first user of the messaging system in a client executed at a user terminal of the first user; responsive to receiving a user activated input at said input region, analysing said input and using said analysis to match said input to a type of user activity from a predetermined set of user activities; and transmitting a message comprising data representing said type of user activity from the user terminal of said first user to a user terminal of at least one other user of the messaging system over a communications network.

In one embodiment, the method further comprises the steps of: receiving said message at the user terminal of said at least one other user; extracting the data representing said type of user activity from the message; comparing the type of user activity from the message with a last known activity state of the first user and determining an action to take responsive to said comparison; and updating an indicator of user activity displayed in a user interface of a client executed at the user terminal of said at least one other user in accordance with said action.

Preferably, said action comprises one of: removing the indicator from the user interface; replacing the indicator with a different indicator; or maintaining the indicator in the user interface. Preferably, said predetermined set of user activities includes at least one of: a typing activity; a deletion activity; an accidental input activity; an angry user activity; a message completed activity; and a message cancelled activity.

In another embodiment, the method further comprises the steps of: comparing the time period since receiving an input at said input region to a predetermined time interval; and in the case that the time period since receiving an input at said input region exceeds said predetermined time interval, transmitting a message comprising data representing user inactivity from the user terminal of said first user to a user terminal of at least one other user of the messaging system over a communication network.

Preferably, said step of analysing said input comprises detecting the actuation of a specific control on an input device of the user terminal of the first user. Preferably, said step of analysing said input comprises detecting the repeated actuation of a control on an input device of the user terminal of the first user. Preferably, said step of analysing said input comprises detecting the actuation of a plurality of controls that are grouped physically on an input device of the user terminal of the first user. Preferably, said step of analysing said input comprises detecting the simultaneous actuation of a plurality controls on an input device of the user terminal of the first user. Preferably, said step of analysing said input comprises detecting the number of characters present in the input region.

Preferably, the communication network is a peer-to-peer network.

According to another aspect of the present invention, there is provided a messaging system, comprising: a communication network; a user terminal of a first user of the messaging system connected to the communication network; and a user terminal of at least one other user of the messaging system connected to the communication network, wherein said user terminal of the first user executes a client, said client comprising: means for monitoring an input region displayed to the first user of the messaging system; means for analysing a user activated input, responsive to receiving said input at said input region, and using said analysis to match said input to a type of user activity from a predetermined set of user activities; and means for transmitting a message comprising data representing said type of user activity from the user terminal of said first user to the user terminal of the at least one other user of the messaging system over the communication network.

In one embodiment, the user terminal of the at least one other user executes a client, said client comprising: means for receiving said message at the user terminal of said at least one other user; means for extracting the data representing said type of user activity from the message; means for comparing the type of user activity from the message with a last known activity state of the first user and determining an action to take responsive to said comparison; and means for updating an indicator of user activity displayed in a user interface of the client executed at the user terminal of said at least one other user in accordance with said action.

Preferably, said action comprises one of: removing the indicator from the user interface; replacing the indicator with a different indicator; or maintaining the indicator in the user interface. Preferably, said predetermined set of user activities includes at least one of: a typing activity; a deletion activity; an accidental input activity; an angry user activity; a message completed activity; and a message cancelled activity.

In another embodiment, said client executed on the user terminal of the first user further comprises: means for comparing the time period since receiving an input at said input region to a predetermined time interval; and means for transmitting a message comprising data representing user inactivity from the user terminal of said first user to a user terminal of at least one other user of the messaging system over a communication network, in the case that the time period since receiving an input at said input region exceeds said predetermined time interval,.

Preferably, said means for analysing said input comprises means for detecting the actuation of a specific control on an input device of the user terminal of the first user. Preferably, said means for analysing said input comprises means for detecting the repeated actuation of a control on an input device of the user terminal of the first user. Preferably, said means for analysing said input comprises means for detecting the actuation of a plurality of controls that are grouped physically on an input device of the user terminal of the first user. Preferably, said means for analysing said input comprises means for detecting the simultaneous actuation of a plurality controls on an input device of the user terminal of the first user. Preferably, said means for analysing said input comprises means for detecting the number of characters present in the input region.

Preferably, the communication network is a peer-to-peer network.

According to another aspect of the present invention, there is provided a user terminal connected to a communication network and executing a client for use in a messaging system, said client comprising: means for monitoring an input region displayed to a user of the user terminal; means for analysing a user activated input, responsive to receiving said input at said input region, and using said analysis to match said input to a type of user activity from a predetermined set of user activities; and means for transmitting a message comprising data representing said type of user activity from the user terminal to a user terminal of at least one other user of the messaging system over the communication network.

According to another aspect of the present invention, there is provided a computer program product comprising program code means which when executed by a computer implement the steps according to the above method.

BRIEF DESCRIPTION OF THE DRAWINGS

For a better understanding of the present invention and to show how the same may be put into effect, reference will now be made, by way of example, to the following drawings in which:

FIGS. 5A and 5B show user interfaces during an IM conversation for User A and User B;

FIG. 6 shows a flowchart for a method of providing activity notification messages that accurately reflect user behaviour;

FIG. 7 shows the structure of an activity notification message;

FIG. 8 shows a flowchart of the process performed at a client following receipt of an activity notification message;

FIGS. 12A and 12B shows user interfaces displayed for accidental input activity.

DETAILED DESCRIPTION

Figure 1:
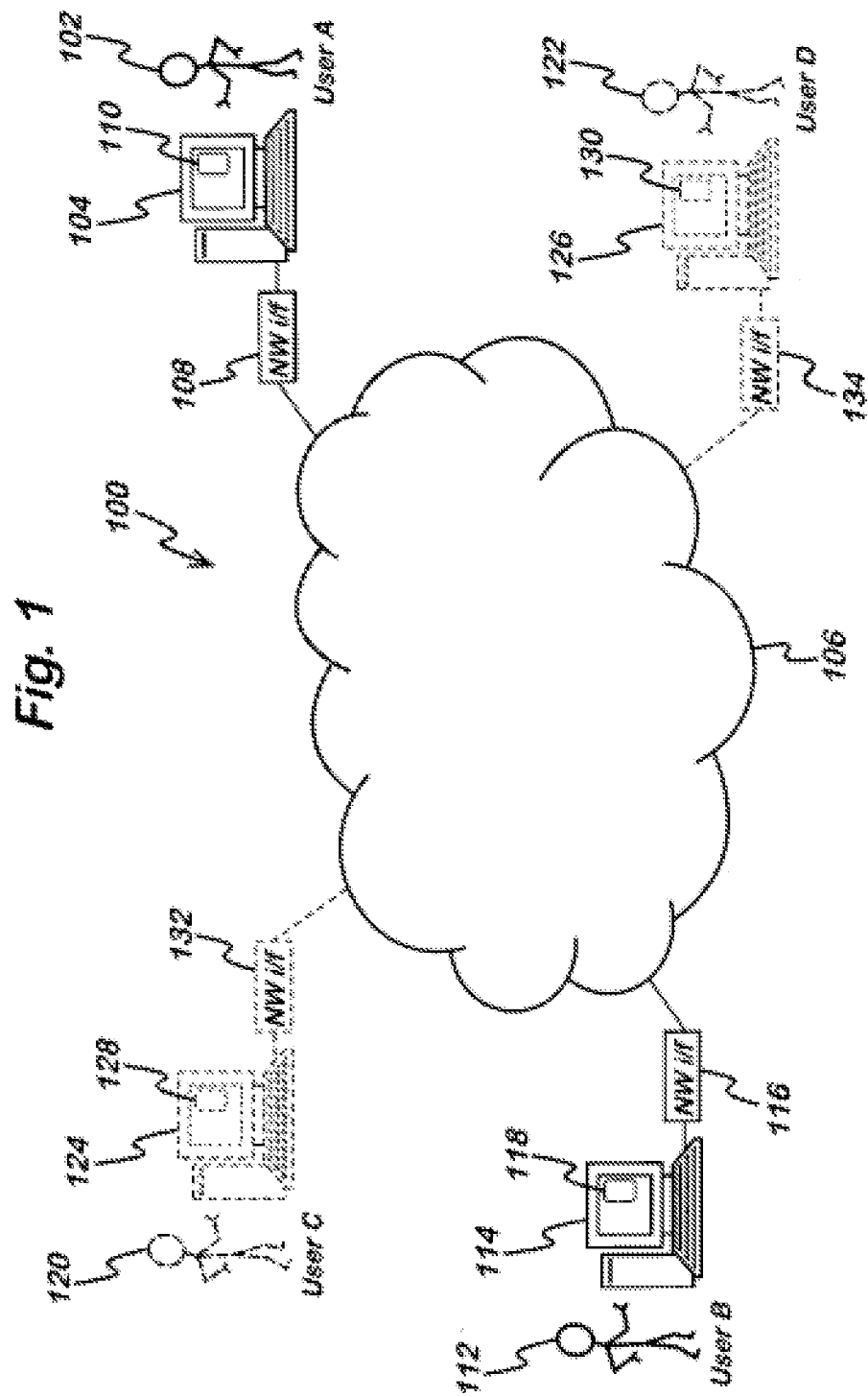
FIG. 1 shows an instant messaging system.

Reference is first made to FIG. 1, which illustrates an instant messaging system 100. A first user of the IM system (denoted "User A" 102) operates a user terminal 104, which is shown connected to a network 106, such as the Internet. The user terminal 104 may be, for example, a personal computer ("PC"), personal digital assistant ("PDA"), a mobile phone, a gaming device or other embedded device able to connect to the network 106. The user terminal 104 has an interface means to receive information from and output information to a user of the device. In a preferred embodiment of the invention the interface means of the user terminal 104 comprises a display means such as a screen and a keyboard and mouse. The user terminal 104 is connected to the network 106 via a network interface 108 such as a modem, and the connection between the user terminal 104 and the network interface 108 may be via a cable (wired) connection or a wireless connection. The user terminal 104 is running a client 110. The client 110 is a software program executed on a local processor in the user terminal 104, which provides the IM connections between the users of the IM system. The client is described in more detail with reference to FIGS. 3, 4 and 5 hereinafter.

Also connected to network 106 is at least one other user of the IM system 100. For example, FIG. 1 illustrates User B 112 operating a user terminal 114 and connected to the network 106 via a network interface 116. User terminal 114 executes client software 118 similar to client 110 executed on the user terminal 104 of User A 102. FIG. 1 also illustrates further users, Users C and D (120 and 122, respectively), who are connected to the network 106 with user terminals (124, 126) executing clients (128, 130) via network interfaces (132, 134).

Note that, in practice, there may be a very large number of users connected to the IM system, but these are not illustrated in FIG. 1 for clarity.

In preferred embodiments, the clients of the IM system 100 communicate using a peer-to-peer ("P2P") network topology built on proprietary protocols. An example of this type of communication system is the Skype™ system. To access the peer-to-peer network, the user must execute client software provided by the operator of the P2P system on their user terminal, and register with the P2P system. When the user registers with the P2P system the client software is provided with a digital certificate from a central server. Once the client software has been provided with the certificate, communication can subsequently be set up and routed between users of the P2P system without the further use of a central server. In particular, the users can establish their own communication routes through the P2P system based on exchange of one or more digital certificates (or user identity certificates, "UIC") to acquire access to the P2P system. The exchange of the digital certificates between users provides proof of the user's identity and that they are suitably authorised and authenticated in the P2P system. Therefore, the presentation of digital certificates provides trust in the identity of the user. It is therefore a characteristic of peer-to-peer communication that the communication is not routed using the central server but directly from end-user to end-user. Further details on such a P2P system are disclosed in WO 2005/009019. However, it will also be apparent that the IM system described herein can also use non-P2P communication systems.

Figure 2:
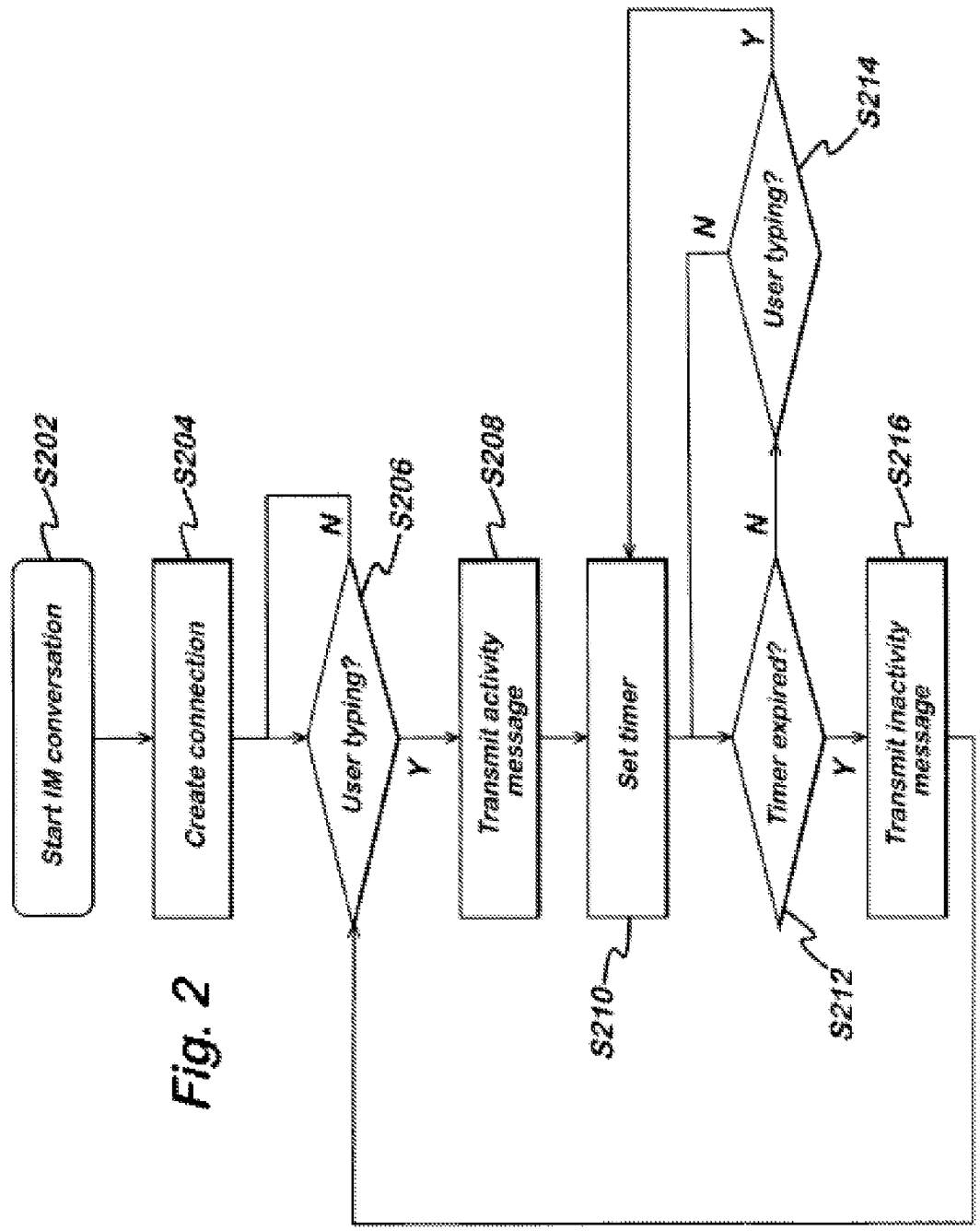
FIG. 2 shows a flowchart of a method for controlling activity notifications in an IM system.

As mentioned previously, it is advantageous to provide indicators of user activity when a user is typing, in order to improve the user experience and conversation flow. For example, if User A 102 and User B 112 in FIG. 1 are engaged in an IM conversation, then it is advantageous for User B 112 to be notified in client 118 if User A 102 is typing a message in client 110 (and vice versa). Reference is now made to FIG. 2, which illustrates a flowchart of a known method for controlling activity notifications in an IM system such as that shown in FIG. 1. In step S202 a user (e.g. User A 102) initiates an IM conversation with another user (e.g. User B 112). A connection across the network 106 is created in step S204. In preferred embodiments, this connection is a P2P connection.

The subsequent steps in FIG. 2 are performed independently by each of the clients (e.g. 110, 118) of the parties engaged in the IM conversation. In step S206, the client monitors whether there is any typing activity at the input field or region of the IM client. Step S206 repeats until some activity is detected. When activity is detected, in step S208, the client transmits a message indicating that there is user activity to the other parties in the IM conversation. The other parties, upon receiving the message indicating user activity, display an indicator on the display of the user terminal.

In step S210, the client that transmitted the activity notification message in step S208 starts a timer running In step S212 the client checks of the timer has expired yet. If not, the client checks if there is any further user activity at the input field of the client in step S214. If there is not further input, then step S212 is returned to and the expiry of the timer is checked. If there is further user input, then step S210 is returned to, such that the timer is started again from the beginning (i.e. it is reset). If, when control is returned to step S212, it is found that the timer has expired, then the client, in step S216, transmits a message to the other parties indicating that there is no user activity. The other parties, upon receiving this message indicating user inactivity, remove the activity indicator on the display of the user terminal.

Therefore, when the method illustrated in FIG. 2 is used, there is only an explicit notification that user activity has started, which triggers an activity notification to be displayed The only way in which the activity notification is removed is by the receipt of the inactivity notification message, which is sent if there has been no activity for a predetermined time interval. As mentioned above, this technique does not accurately reflect the user's behaviour, and hence results in the activity indicator being displayed when messages are not actually being typed.

Figure 3:
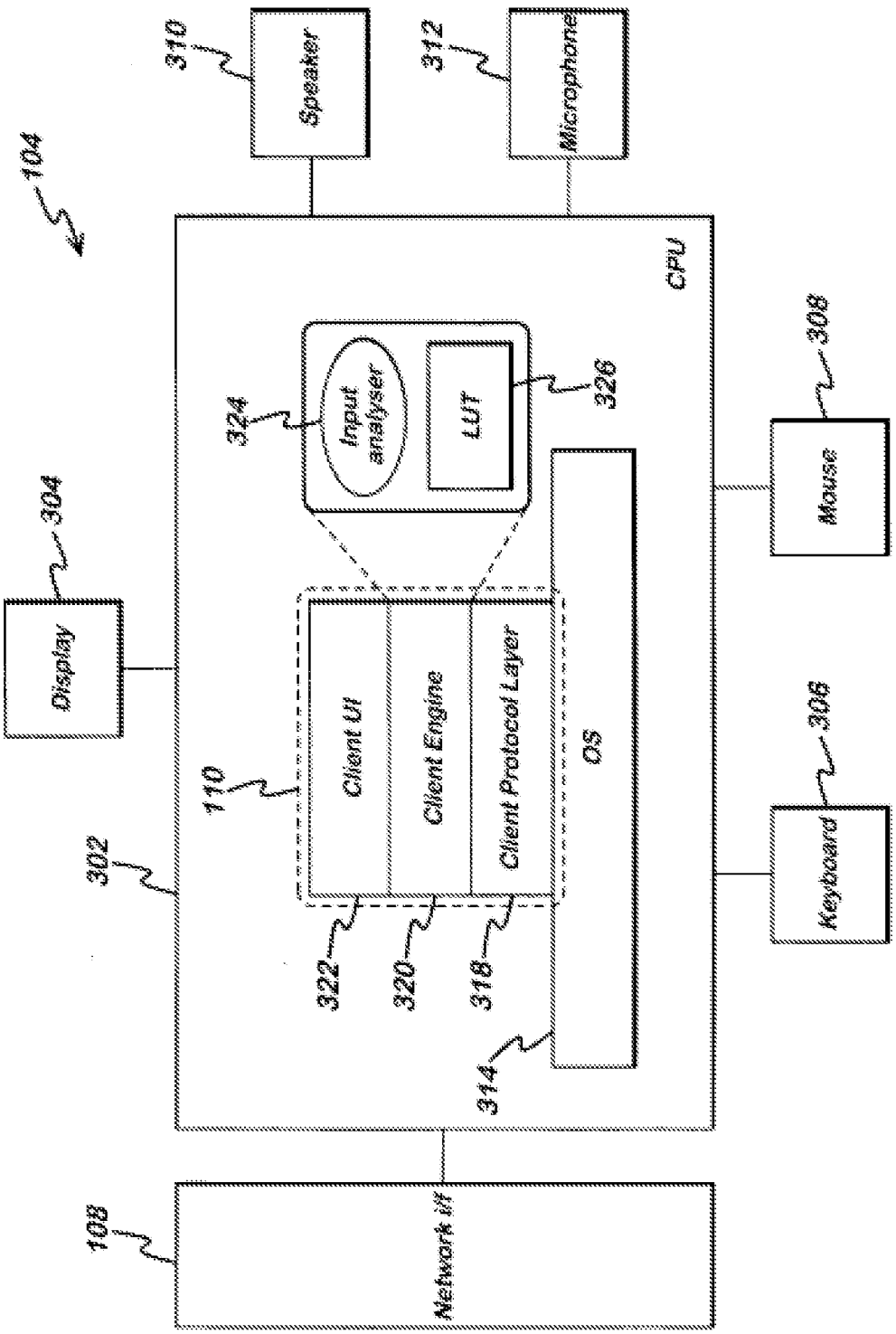
FIG. 3 shows a user terminal executing client software.

FIG. 3 illustrates a detailed view of the user terminal (e.g. 104) on which is executed client 110 according to an embodiment of the invention. The user terminal 104 comprises a central processing unit ("CPU") 302, to which is connected a display 304 such as a screen, an input device such as a keyboard 306, a pointing device such as a mouse 308, and optionally a speaker 310 and a microphone 312. The CPU 302 is connected to a network interface 108 as shown in FIG. 1.

FIG. 3 also illustrates an operating system ("OS") 314 executed on the CPU 302. Running on top of the OS 314 is the client 110. The client 110 comprises several layers, such as a protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 318 of the client software communicates with the operating system 314 and manages the network connections over the network 106.

Processes requiring higher level processing are passed to the client engine layer 320, which handles the processing required for the user to have IM conversations over the network 106. The client engine 320 also communicates with the client user interface layer 322. The client engine 320 may be arranged to control the client user interface layer 322 to present information to the user via the user interface of the client (such as activity indicators) and to receive information from the user via the user interface. In particular, the client engine layer 320 comprises input analysis functionality 324, which analyzes inputs made to the client user interface layer 322 and a look up table ("LUT") 326 which contains predefined patterns of known inputs. These functions will be described in more detail with reference to FIG. 6 below.

Figure 4:
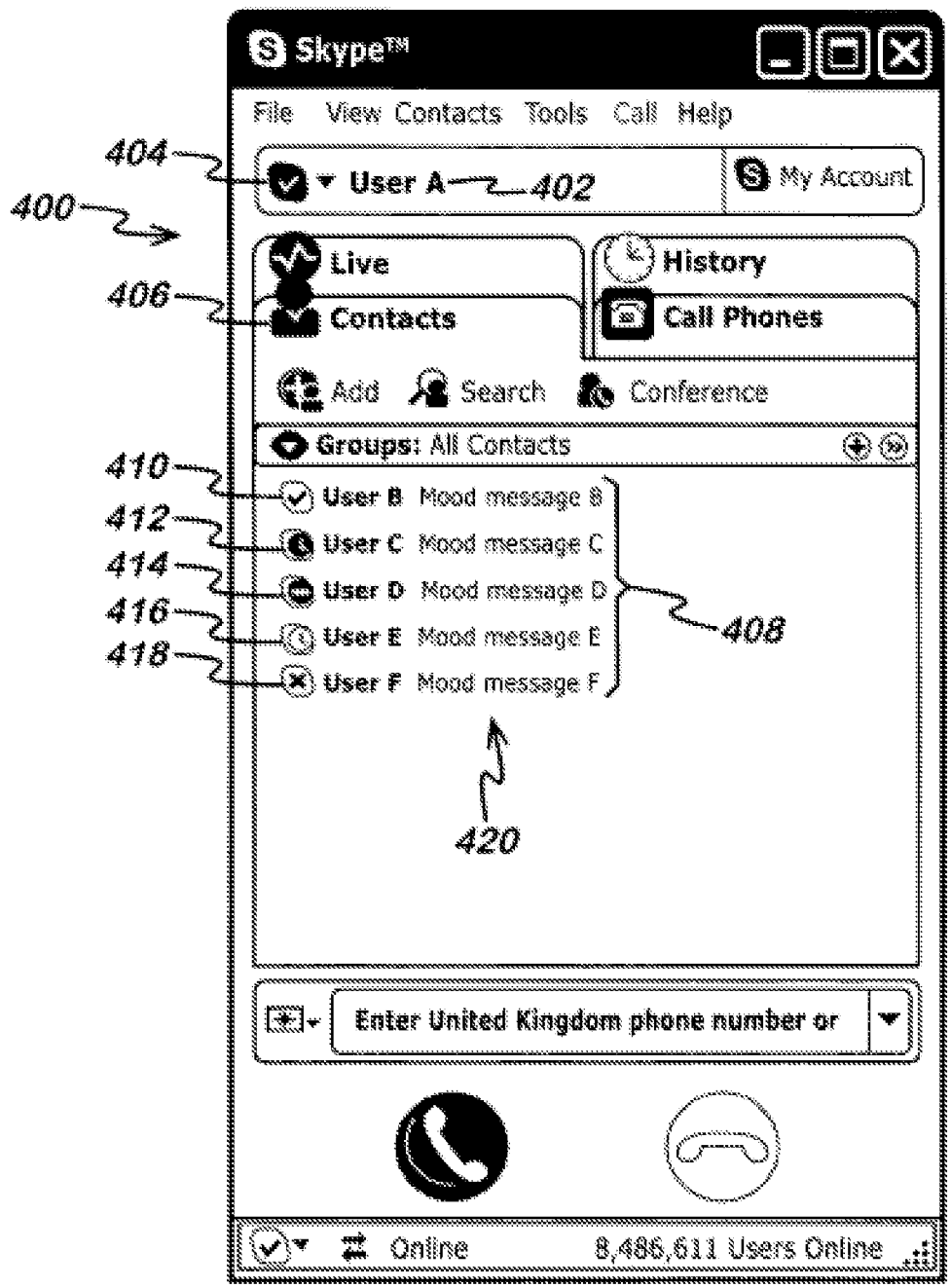
FIG. 4 shows a main user interface of a client.

The client user interface layer 322 defines the information that is presented to the user 102 of the user terminal 104. Examples of client user interfaces are shown in FIGS. 4 and 5. Reference is first made to FIG. 4, which illustrates the main user interface 400 of the client 110 (in this case for User A 102), prior to an IM conversation being initiated. The client user interface 400 displays the username 402 of User A 102 in the IM system, and User A can set his own presence state (that will be seen by other users) using a drop down list by selecting icon 404.

The client user interface 400 comprises a tab 406 labelled "contacts", and when this tab is selected the contacts stored by the user in a contact list are displayed. In the example user interface in FIG. 4, five contacts of other users of the IM system (User B to F) are shown listed in contact list 408. Each of these contacts have authorised the user of the client 110 to view their contact details and online presence and mood message information. Each contact in the contact list has a presence status icon associated with it. For example, the presence status icon for User B 410 indicates that User B is "online", the presence icon for User C 412 indicates that User C is "not available", the presence icon for User D 414 indicates that User D's state is "do not disturb", the presence icon for User E 416 indicates User E is "away", and the presence icon for User F 418 indicates that User F is "offline". Further presence indications can also be included. Next to the names of the contacts in pane 408 are the mood messages 420 of the contacts.

An instant message conversation can be initiated with a user listed in contact list 408 by selecting the contact using pointing device 308 and clicking on a button that appears adjacent to the name of the user.

Figure 5B:
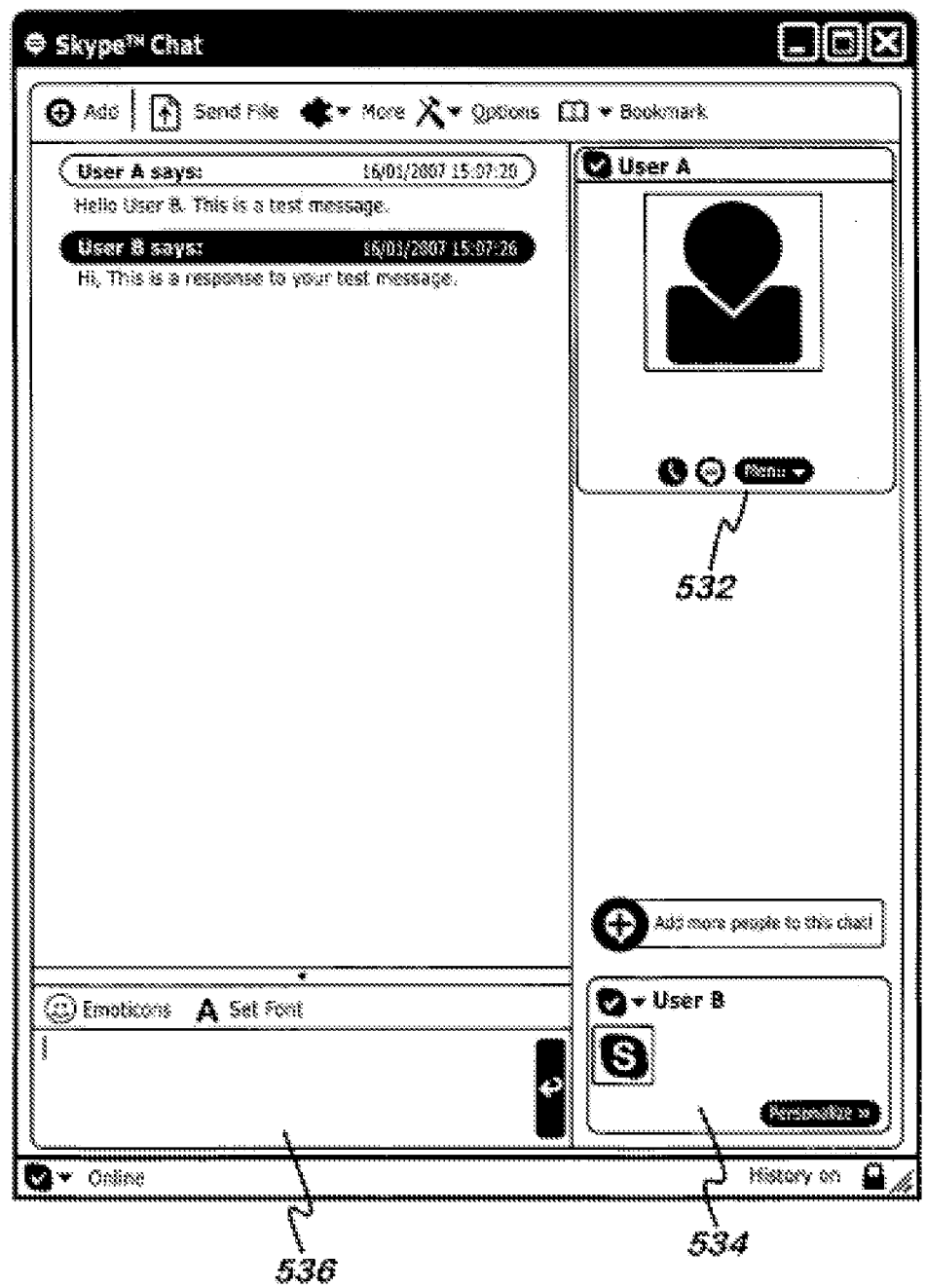

When an IM conversation is initiated with a user, user interfaces such as those shown in FIG. 5 are displayed. In this example, User A 102 has initiated an IM conversation with User B 112. FIG. 5A illustrates the UI displayed on the display of user terminal 104 of User A 102, and FIG. 5B illustrates the UI displayed on the user terminal 114 of User B 112.

The UI shown in FIG. 5A comprises a sent message window 502, which shows messages from both parties to the IM conversation (i.e. User A and User B) that have already been sent. For example, a previously sent message from User A is shown at 504 and a previously sent message from User B is shown at 506. At the right hand side of the UI is shown the participants in the IM conversation. In this example, a contact card 508 for User B is shown (as this is the user that User A is communicating with). The contact card 508 for User B displays User B's name 510, presence icon 512 and avatar 514.

Above the message window 502 is a bar that comprises buttons for controlling the IM conversation, which are outside the scope of this description. Below the message window 502 is a user input field or region 518. The user input field is the region of the UI in which messages are composed by the user before they are sent. The user can compose messages in the input field 518 by placing the cursor in the field and typing using the keyboard 306. The user may also place other information in the message, such as icons selected from menu. To send a message that has been composed in the input field 518, the user presses the "enter" key on the keyboard or selects button 522.

Adjacent to the user input field 518 is a contact card 524 for the user of the client. In this example, FIG. 5A shows User A's client, and hence User A is shown in contact card 524. The contact card 524 allows the user to set the information that is displayed to the other members of the IM conversation. The contact card 524 displays User A's name 526, presence icon 528 and avatar 530.

FIG. 5B illustrates the equivalent UI shown at User B's terminal 114 (when in conversation with User A). The UI is identical to that shown in FIG. 5A, except that contact card 532 shows the details for User A (as the UI in FIG. 5B shows the conversation from User B's perspective), and contact card 534 shows details for User B. Furthermore, a message entered in input field 536 will obviously result in a message being sent from User B to User A.

The UI shown in FIGS. 5A and 5B illustrates a case where there is no activity notification system present, and hence there is no indication in User B's UI in FIG. 5B that User A is typing message, even though a part-typed message is shown in the user input field 518 of FIG. 5A. Further client UIs shown hereinafter will illustrate the case where activity indicators are employed.

Reference is now made to FIG. 6, which illustrates a flowchart for a method of providing activity notifications that accurately reflect user behaviour. In step S602 an IM conversation is initiated. For example, referring again to FIGS. 1 and 4, User A 102 can initiate an IM conversation by selecting the contact for User B 112 in the contact list 408 of UI 400 of client 110. In step S604 a connection is created over the communication network 106. In preferred embodiments, this is a P2P connection.

In step S606, the clients of the users connected in the IM conversation (e.g. 110 and 118) monitor the input fields (e.g. input fields 518 and 536 of FIGS. 5A and 5B) for any activity by the users. The clients remain in this state until activity is detected. For the purposes of this explanation, it is assumed that User A begins typing a message in input field 518, thereby triggering step S606.

After activity at the user input field, in step S608, the client analyzes the input to the input field in order to detect known patterns in the input. This is achieved by the client UI layer 322 providing information to the client engine 320. The client engine 320 has analyzer functionality 324 which is arranged to extract pattern information from the user input, and match this to known patterns. The known patterns are stored in look up table 326.

For example, the input analyzer 324 can analyze several attributes of the inputs entered. These include, but are not limited to: detection of specific keys; repetition of the same keys; the physical grouping of the keys on the keyboard; simultaneous presses of multiple keys; and the number of characters present in the input field.

As a first example, the case of a user typing "normal" text in the input field is considered. A "normal" message is a message deliberately types by the user with the intention of sending it to the other party. The input analyzer 324 looks at the sequence of keys entered by the user, and from this determine that they are, for example, comprised of multiple keys (i.e. not all the same key), generally separated physically on the keyboard (i.e. not all from the same region of the keyboard), and separated in time (i.e. not entered simultaneously). From this information, the input analyzer can deduce that the user activity is the typing of a normal message. This information can subsequently be used to indicate this type of activity to the remote user (as described in mere detail hereinafter).

As a second example, a user may have already typed some text into the input field, but has changed his mind, and started to delete the text. The user can delete the text through repeated presses of the "backspace" or "delete" keys on the keyboard, or by holding down the "backspace" or "delete" keys (which has the same effect as repeated key-presses). The input analyzer can detect the use of these specific keys, and when it also detects their repeated use the input analyzer can deduce that the user is deleting a message. The input analyzer can also detect that a user has highlighted a significant part of a message using the pointing device, and deleted the highlighted part.

As a third example, a user may have the IM conversation UI open on his user terminal, but is not intending to send a message at the present time. However, accidental input from the keyboard can occur, e.g. by a foreign object actuating one or more keys of the keyboard (such as a book being accidentally rested on the keyboard or a cat walking over the keyboard). In this case, the input analyzer can detect that there is repeated actuation of one or more keys (e.g. due to them being held down by a foreign object) or simultaneous actuation of keys that are grouped together on the keyboard. From this, the input analyzer can deduce that the input at the input field is unintentional, and is not the deliberate typing of a message.

As a fourth example, the input analyzer can be arranged to detect that the user has hit his keyboard in anger or frustration. This can be achieved by detecting the near-simultaneous input of multiple keys all grouped in the same area of the keyboard.

As a fifth example, the input analyzer can detect the actuation of specific keys. For example, the input analyzer can detect that the "enter" key has been pressed, or that the send button 522 (in FIG. 5A) has been activated. This allows the input analyzer to deduce that the message has been completed and is being sent to the other party, and hence that typing has been completed.

A sixth example extends the functionality of the second example above. The input analyzer can monitor the number of characters that are present in the input field. This can be used to detect that a user has deleted all the characters from a message (i.e. there are zero characters in the input field). This can be used to distinguish between the case where a user has deleted part of a message (e.g. with repeated presses of the backspace key) and when a user has deleted an entire message.

It will readily be appreciated that many other types of user activity may also be detected by analysing input patterns, and are not limited to the above examples.

In step S610, the client determines whether the analyzed input patterns match one of the predetermined input patterns. If the analyzed pattern does match a known pattern, then, in step S610, a code is generated to identify the type of activity determined by the input patterns. The codes used are predefined, and are stored in LUT 326. If the analyzed pattern cannot be matched to a known patter, then in step S614 a default code is used to represent activity. In preferred embodiments, this code is the same code used to represent normal typing activity.

In step S616, the client checks whether the activity type detected matched the previous activity type transmitted to the remote user. If it is a new (i.e. different) type of activity, then in step S618 a message is generated and transmitted to the remote user indicating the type of activity that has been detected. If the current activity type matches the previous one sent, then there is no need to send a further activity notification message to the remote user.

The structure of the activity notification message 700 is shown illustrated in FIG. 7. The message 700 comprises a header 702, the username 704 of the user sending the message (so that the user performing the activity may be identified), and activity code 706. In preferred embodiments, the activity code 706 is in the form of a bitmap, where combinations of bits in the bitmap indicate the different types of activity that can be detected.

Steps S620 to S628 resemble steps S210 to S216 from FIG. 2, in that they provide a time-out to detect that a user has become idle for a predetermined time period, and that there is no further activity. In step S620, the client starts a timer running, and in step S622 the client checks of the timer has expired yet. If not, the client checks if there is any further user activity at the input field of the client in step S624. If there is not further input, then step S622 is returned to and the expiry of the timer is checked. If there is further user input, then step S608 is returned to, such that the input patterns detected are once again analyzed. If, when control is returned to step S622, it is found that the timer has expired, then the client, in step S626, generates the appropriate code to signify user inactivity, and in step S628 transmits a message to the other parties indicating that there is no user activity. In preferred embodiments, the message sent at the expiry of the time-out is the same message as shown in FIG. 7, but contains a bitmap that indicates the user has become idle. After step S628, control returns to step S606, and the client awaits further user activity.

Note that in some embodiments, S608 can include an initial check to determine if the user has started to enter information into a user input field which was previously empty. In this instance, the input analyzer can make an initial assumption from the very first key-press that this corresponds to normal typing, and in response to this sends an activity notification indicating the user is typing. This ensures that the remote user is initially displayed a typing indicator as a default setting, in order to give an indication of user activity to the remote user as soon as possible after typing begins. However, as the number of key-presses at the input field increases, the input analyzer can perform further processing on this information and further deduce information about the user activity, and subsequently send further notification messages to update the activity indicator at the remote user if required.

Reference is now made to FIG. 8, which illustrates a flowchart of the process performed at the client of a user that has received an activity notification message 700.

In step S802, the activity notification message (such as that shown in FIG. 7) is received at the client. The information from the message is passed to the client engine layer 320 to be processed. In step S804, the type of activity is determined from the activity code 706 in the message 700. This is achieved by using the LUT 326 to match the activity code to the type of activity.

In step S806, the current state of the activity indicator in the UI of the client is determined. For example, it can be determined whether there is currently an activity indicator present, and, if so, what type of activity it is indicating. In step S808 the action that needs to be taken in response to the activity notification message is determined. More specifically, the client must decide whether or not to change the current state of the activity notification to a different state. In particular, as shown in step S810, there are three possible outcomes for the action to be taken. Either the current activity indicator can be removed (S812), the current activity indicator can be replaced with a different type of indicator (S814) or the current activity indicator can be maintained in its current state (S816).

Examples of the operation of the flowcharts shown in FIGS. 6 and 8 are now described with reference to FIGS. 9 to 13, which illustrate the effect of the processes on the UI of the client in several example scenarios.

Figure 9A:
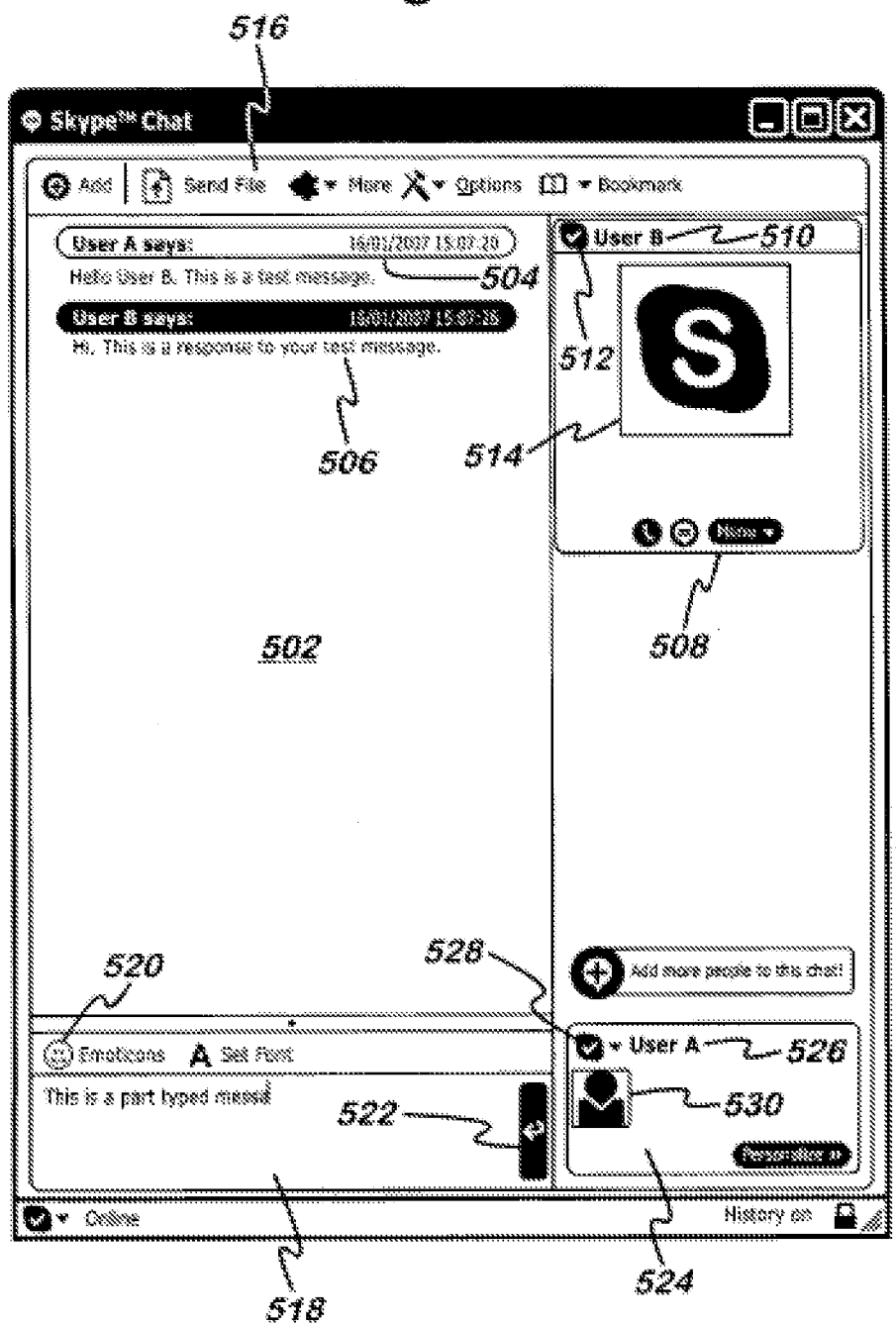
FIGS. 9A and 9B shows user interfaces displayed for normal typing activity.
Figure 9B:
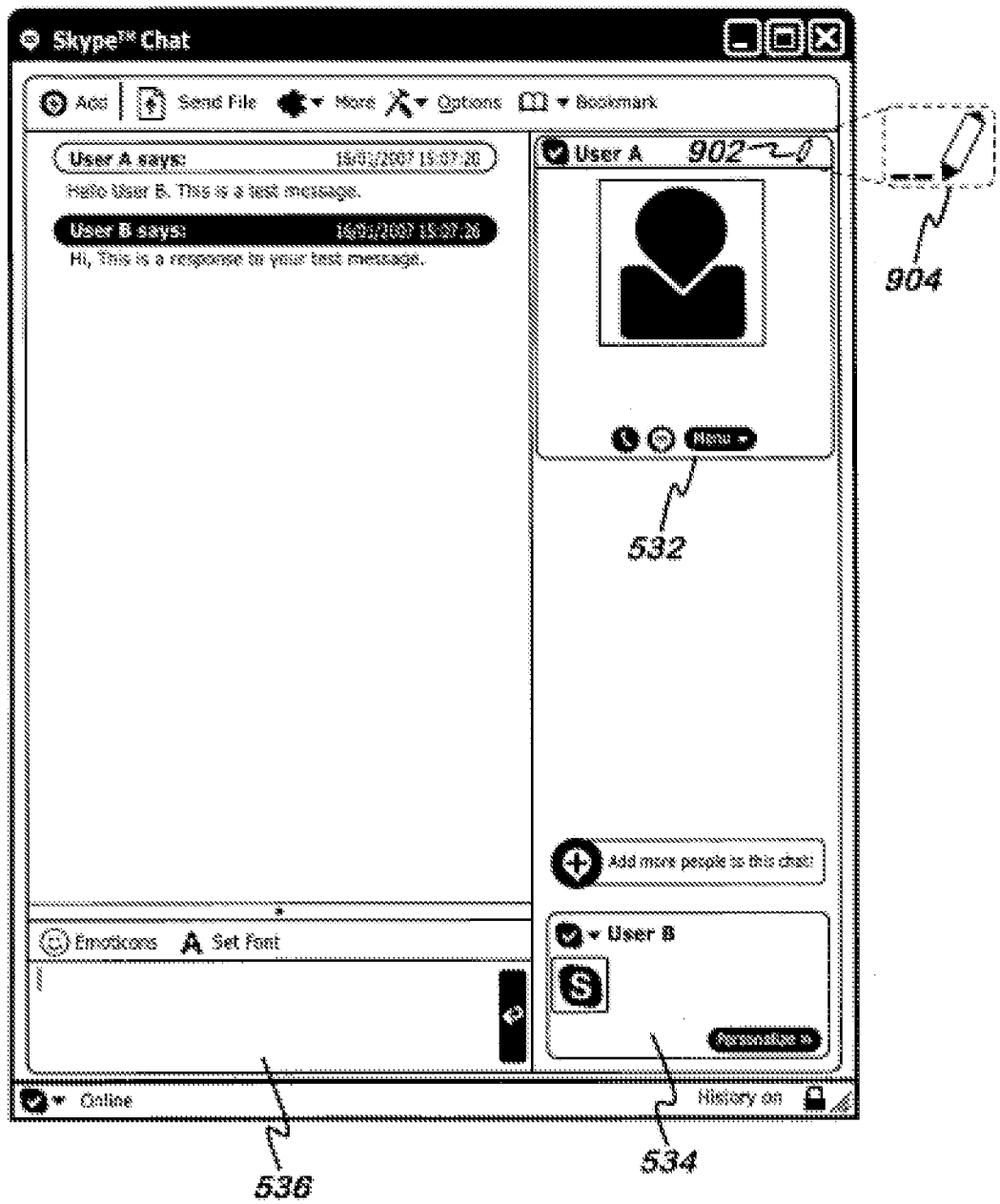

Reference is first made to FIGS. 9A and 9B, which illustrate a similar scenario to that illustrated in FIGS. 5A and 5B above. FIG. 9A shows the client UI for User A 102, who has initiated an IM conversation with User B 112. The information displayed in the UI shown in FIG. 9A is identical to that shown in FIG. 5A. In this example, User A has partly-typed a message into input field 518. As a result of User A 102 typing this message, the client 110 executed on User A's terminal 104 has analyzed the input patterns, and determined that this corresponds to normal typing. This has been encoded into an activity notification message 700 (see FIG. 7), and transmitted to User B 112 (the other participant in the IM conversation).

FIG. 9B illustrates the UI of the client for User B 112, following the reception of the activity notification message. Prior to receiving the activity notification message, the client showed no activity indicator (as in FIG. 5B). The client 118 of User B 112 has determined from the activity notification message that User A's activity corresponds to normal typing. The client 118 has therefore determined that an indicator needs to be placed in the UI indicating typing by User A. The typing activity indicator 902 is shown in User A's contact card 532. In the example shown in FIG. 9B, the typing activity indicator is in the form of a pencil icon. This is shown enlarged at 904 for clarity. Any other suitable form of indicator could also be used, such as a written indication instead of an icon. In preferred embodiments, the pencil icon 902 is animated.

The pencil icon 902 remains on the UI of User B's client, indicating that User A is typing, until a further activity notification message is received. For example, if User A 102 completed the message and pressed "enter" or button 522, then a further activity notification message would be sent with a code indicating that the message was completed. This would prompt User B's client 118 to remove the pencil icon 902 from the UI. Similarly, if User A 102 stopped typing, such that the timer at step S620 in FIG. 6 expired, then an activity notification message is sent to User B's client 118, and the pencil icon 902 is removed or replaced with another icon to indicate that User A 102 has become idle.

Figure 10A:
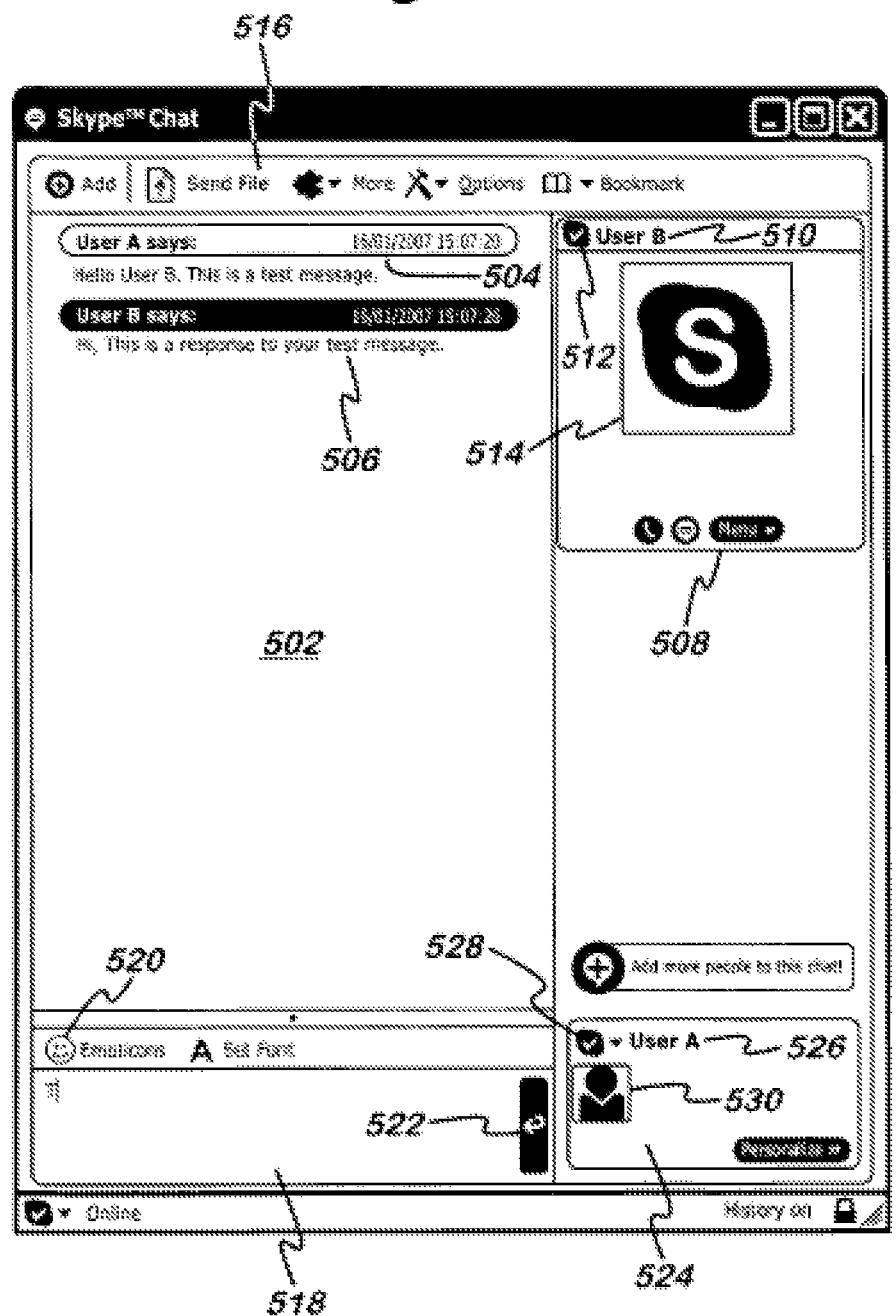
FIGS. 10A and 10B shows user interfaces displayed for deletion activity.
Figure 10B:
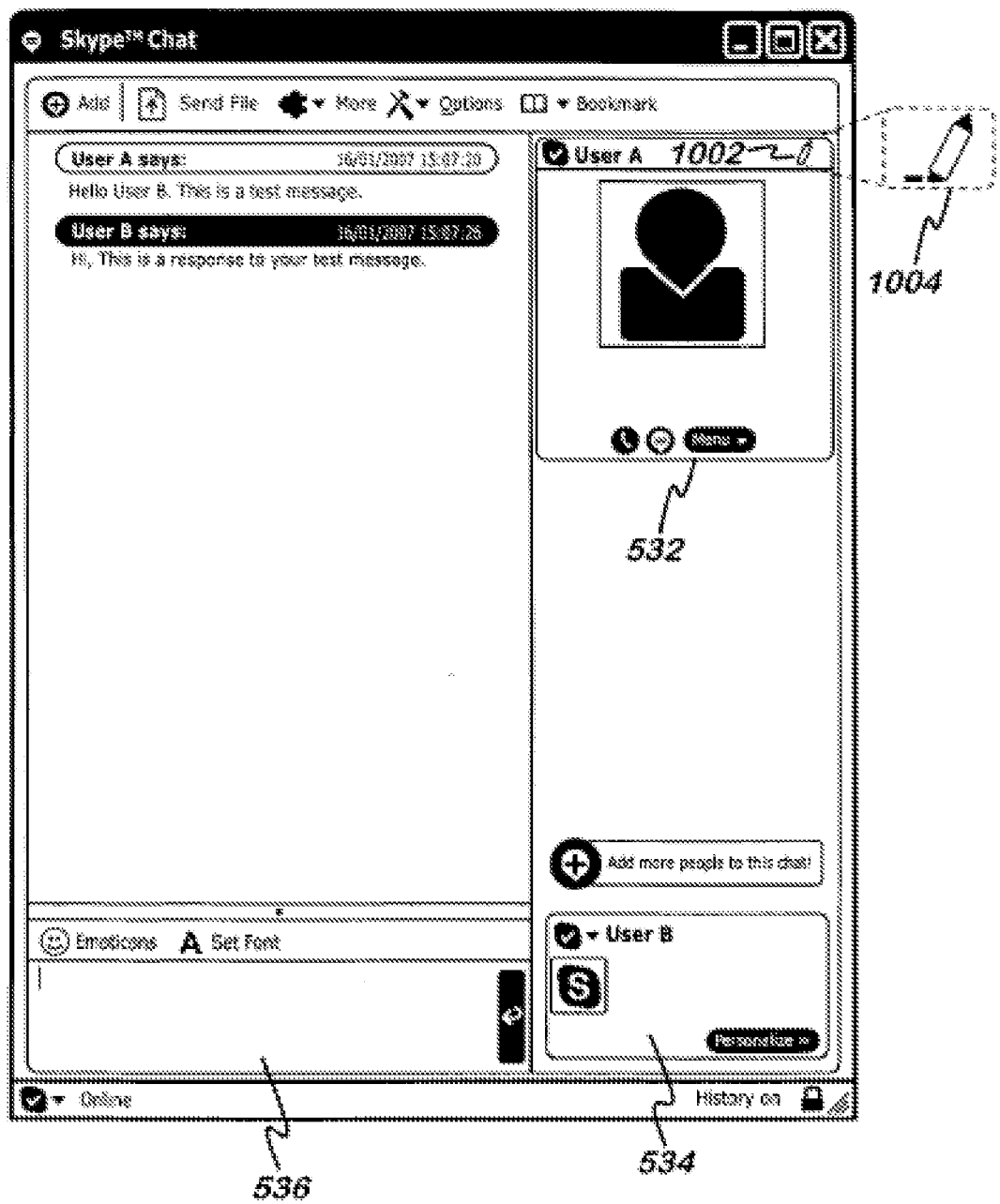

Reference is now made to FIGS. 10A and 10B, which illustrate the scenario in which User A was typing a message in the input field 518, but has changed his mind and has deleted almost all of the message. Prior to detecting the repeated deletion of characters, the client 110 of User A will have detected the typing of the (now deleted) message, and sent an activity notification message to the client 118 of User B. This will have prompted the client of User B to show the typing indicator as illustrated in FIG. 9B. However, User A 102 has now deleted most of the unsent message. The deletion is detected by the input analyzer, and an activity notification message 700 is generated by the client of User A including the code for the activity of deletion.

The effect of the receipt of this activity notification message on the UI of User B is shown in FIG. 10B. As mentioned, this UI previously showed the pencil icon 902. However, following the notification that User A is deleting a message, the icon has been replaced. In this example, the icon is again a pencil 1002, but the pencil has been inverted so that it is shown using an eraser mounted on the end of the pencil as opposed to writing (shown enlarged at 1004 for clarity). In preferred embodiments, this icon is animated. In alternative embodiments, the indication could use text rather than an icon, or any other suitable form of indication.

Furthermore, referring again to FIG. 10A, when all of the characters have been deleted from input field 518, a further activity notification message 700 can be sent to User B. This message informs User B's client that the message has been completely deleted. This information is used by User B's client 118 to change the activity notification. For example, the client 118 could remove the erasing notification and show no icon (thereby indicating no activity). Alternatively a different icon could be used.

Figure 11A:
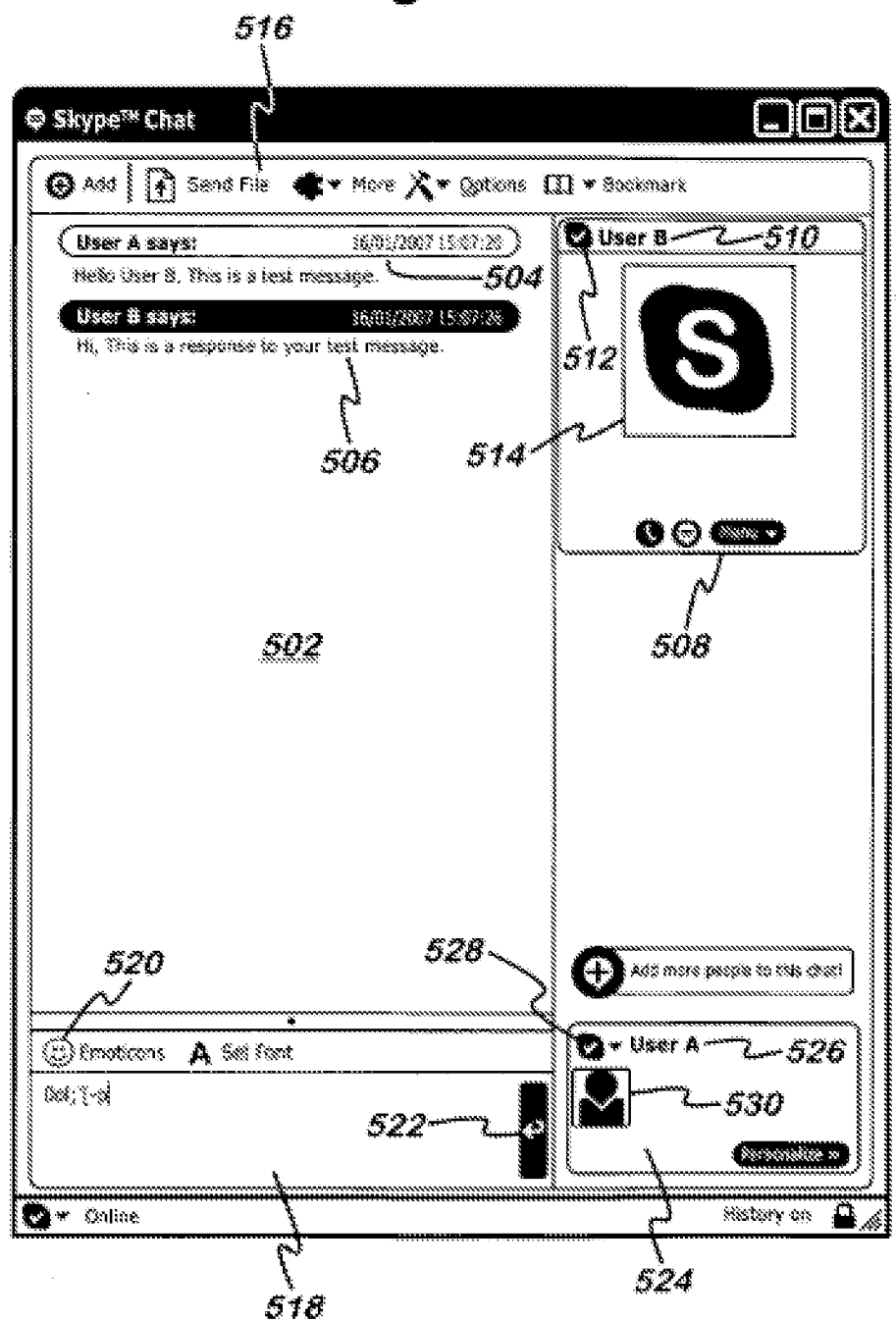
FIGS. 11A and 11B shows user interfaces displayed for angry user activity.
Figure 11B:
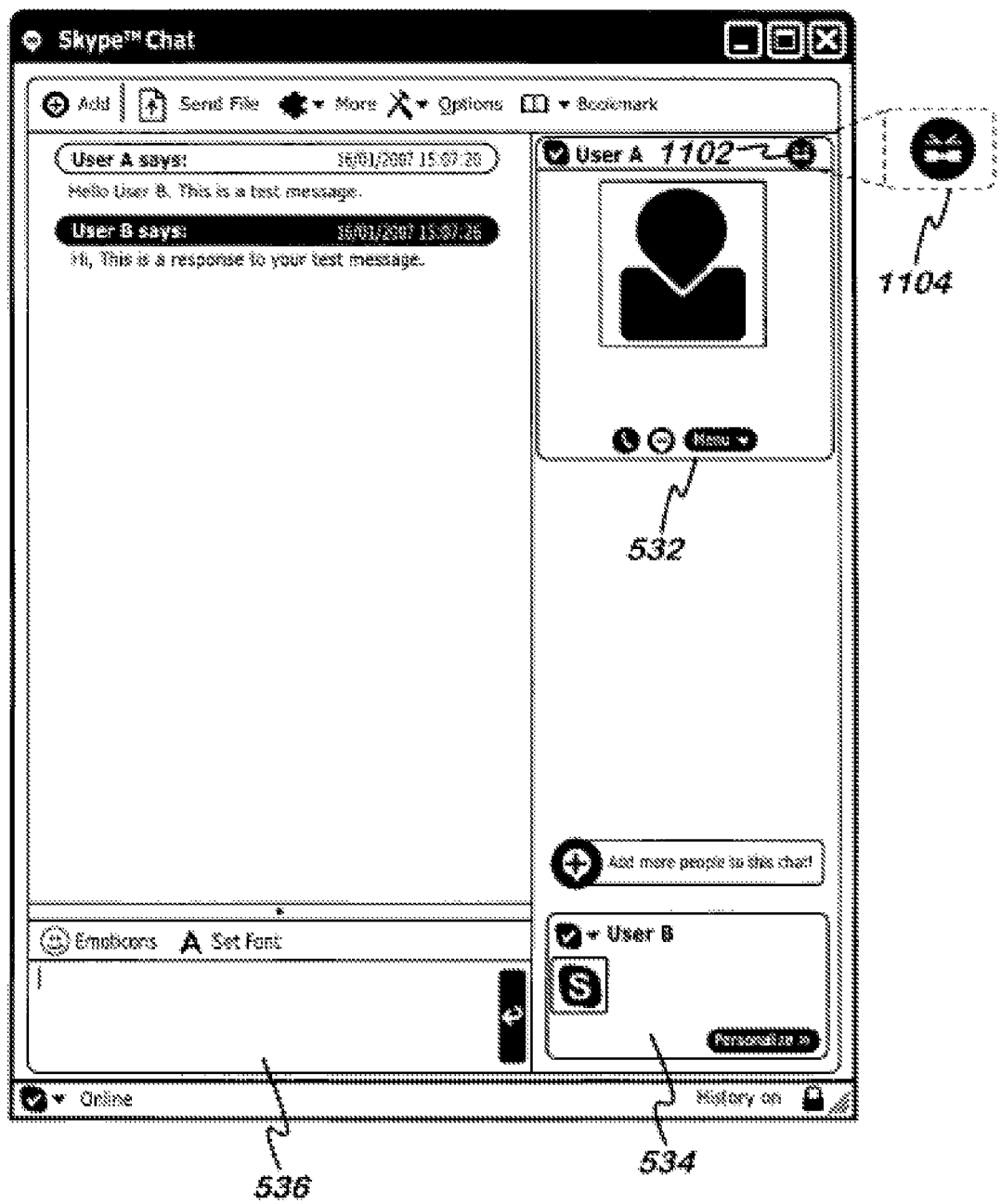

Reference is now made to FIGS. 11A and 11B, which illustrate a further type of user activity being detected. In FIG. 11A, User A has hit his keyboard in frustration. This has resulted in a set of characters being entered into the input field 518 that are characterised by being grouped together on the keyboard, and were also entered near-simultaneously. This is analyzed by the input analyzer, which deduces the user behaviour and transmits a message to User B containing the appropriate code.

The result of receiving the activity notification message with this code is shown in FIG. 11B. In this example, the activity indicator is shown as an angry face 1102 (enlarged at 1104 for clarity). This indicator therefore attempts to communicate the emotions of User A to User B by interpreting the inputs entered by User A.

Figure 12B:
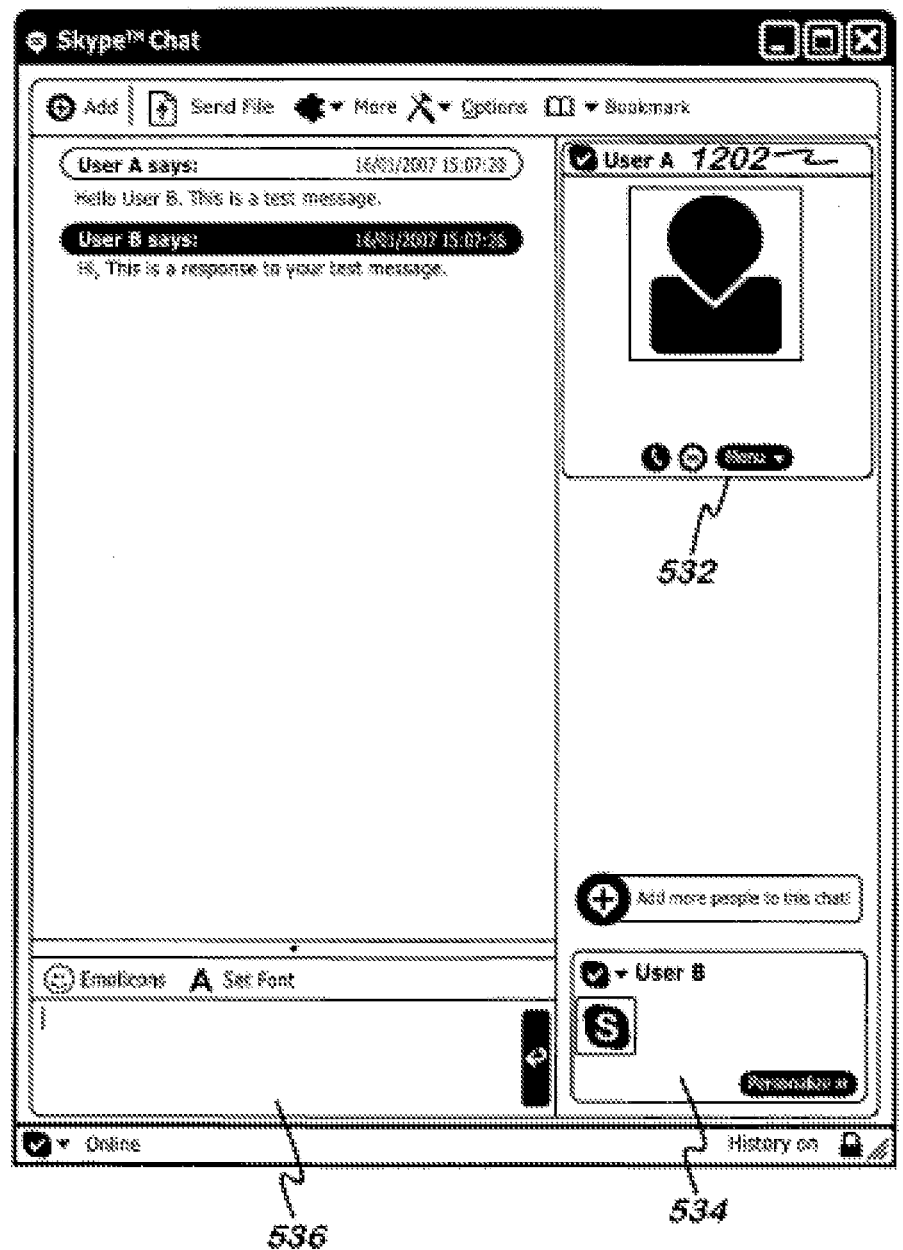

Reference is now made to FIGS. 12A and 12B, which illustrate a scenario in which the input detected at the input field is detected as an unintentional input by the user. FIG. 12A illustrates the client for User A, and in this exemplary scenario User A has accidentally left an item against the "0" key of the keyboard, thereby giving rise to a string of zeroes entered into it being rapidly entered into the input field. This is detected by the input analyzer, and interpreted as an accidental input. This information is converted to a code and transmitted in an activity notification message. This is reflected in the UI of User B, which reads the activity type code and determines that the appropriate action to take is to remove any pre-existing activity indicator, so that region 1202 of the UI shows no activity. The ability to transmit a message and remove an activity indicator in response thereto is an important function, as the first few entered characters of an accidental input may trigger a "normal" typing message to be sent thereby giving the remote user the impression that a message is being typed. However, by sending a further message once it is determined that the input is accidental allows the typing indicator to be rapidly cleared from the remotes user's UI.

Figure 13:
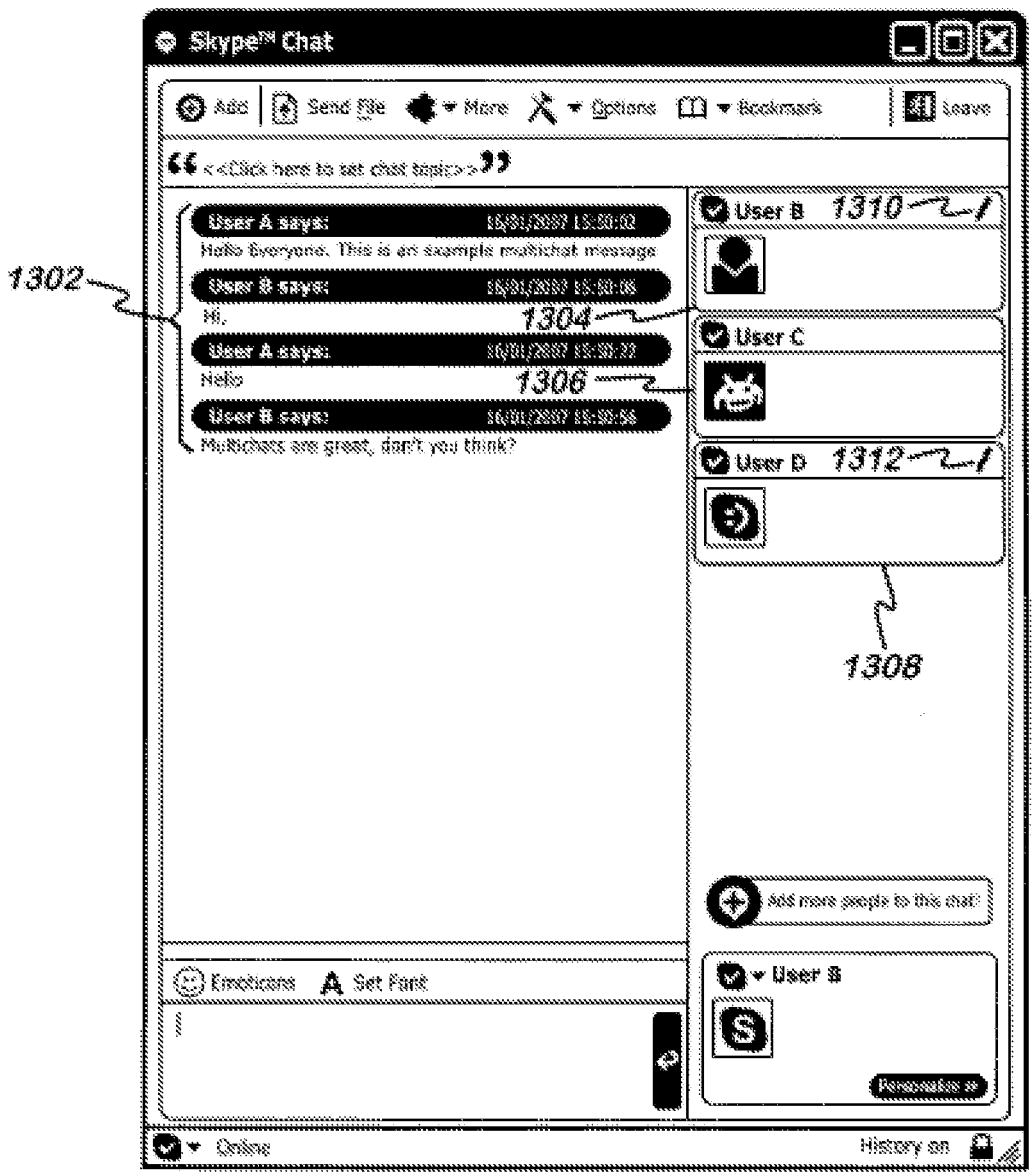
FIG. 13 shows a user interface for a multichat.

Reference is now made to FIG. 13, which illustrates the use of activity indicators in a multichat scenario. A multichat is an IM conversation in which there are more than two participants. The above-described techniques allow activity notifications to be provided for every member of the IM conversation. The UI shown in FIG. 13 shows the client 118 for User B, who is engaged in an IM conversation with User A 102, User C 120 and User D 122. Previous messages sent in the IM conversation are shown at 1302. Contact cards are shown for Users A, C and D at 1304, 1306 and 1308 respectively. The client 118 for User B has, in this example, received activity notification messages from User A's client 110 and User D's client 130, indicating that these users are typing (it will be recalled that the activity notification messages 700 contain a field for the username 704 to allow the receiving client to identify the user to which the message relates). This activity is indicated by activity indicators 1310 for User A and 1312 for User D.

While this invention has been particularly shown and described with reference to preferred embodiments, it will be understood to those skilled in the art that various changes in form and detail may be made without departing from the scope of the invention as defined by the appendant claims. For example, the preceding example embodiments have described the use of a keyboard for providing input to the IM system. It will be understood that any suitable form of input device could also be used, such as handwriting recognition, input controlled by a pointing device or stylus, a touchscreen, or a numeric keypad.

What is claimed is:

1. One or more computer-readable storage memory comprising computer-readable instructions which, responsive to execution by at least one processor, are configured to:
    monitor an input region of a user interface associated with a messaging system;
    receive user activated input via said input region;
    responsive to receiving the user activated input, analyze the user activated input to identify a type of user activity from a predetermined set of user activities, wherein the predetermined set of user activities comprises at least a deletion activity, an accidental input activity, and a message completed activity; and
    transmit, over a communication network, a message comprising data representing the identified type of user activity from a first user terminal to at least a second user terminal.

2. The computer-readable storage memory of claim 1, wherein the computer-readable instructions are further configured to:
    receive at least one message over the communication network;
    extract, from the at least one message, data representing a type of user activity; and
    update an activity indicator on a user interface based, at least in part, on the extracted type of user activity.

3. The computer-readable storage memory of claim 2, wherein the computer-readable instructions are further configured to:
    compare the extracted type of user activity to the predetermined set of user activities effective to determine an extracted activity code associated with the extracted type of user activity; and
    identify how to update the activity indicator on the user interface based, at least in part, on the extracted activity code.

4. The computer-readable storage memory of claim 3, wherein the computer-readable instructions are further configured to:
    identify a current activity code associated with the activity indicator on the user interface;
    compare the current activity code with the extracted activity code effective to determine whether the current activity code matches the extracted activity code;
    responsive to determining the current activity code and the extracted activity code match, maintain the activity indicator on the user interface; and
    responsive to determining the current activity code and the extracted activity code are different, replace the activity indicator on the user interface with an indicator associated with the extracted activity code.

5. The computer-readable storage memory of claim 4, wherein the computer-readable instructions are further configured to remove the activity indicator from the user interface responsive to determining the extracted activity code indicates user inactivity.

6. The computer-readable storage memory of claim 2, wherein the activity indicator comprises an icon.

7. The computer-readable storage memory of claim 1, wherein the computer-readable instructions are further configured to:
    responsive to identifying the type of user activity from a predetermined set of user activities, compare the identified type of user activity to a previous user activity type transmitted to the at least second terminal effective to determine whether the identified type of user activity matches the previous user activity type;
    responsive to determining the identified type of user activity and previous user activity type are different, generate the message comprising data representing the identified type of user activity for transmission; and
    responsive to determining the identified type of user activity and previous user activity match, determine not to generate and transmit the message.

8. One or more computer-readable storage memory comprising computer-readable instructions which, responsive to execution by at least one processor, are configured to:
    display a user interface associated with an instant messaging system, the user interface comprising:
        a user input region configured to accept input associated with at least one conversation associated with the instant messaging system;
        a contacts region configured to display one or more contacts associated with the at least one conversation; and
        a message region configured to display one or more previous messages exchanged between the one or more contacts associated with the at least one conversation; and
    monitor the user input region effective to:
        identify input via the user input region;
        determine a type of user activity associated with the input from a predetermined set of user activities, wherein the predetermined set of user activities comprises at least a deletion activity, an accidental input activity, and a message completed activity; and
        transmit a message comprising data associated with the determined type of user activity to the one or more contacts.

9. The computer-readable storage memory of claim 8, wherein the computer-readable instructions are further configured to:
    receive one or more messages from at least one of the one or more contacts associated with the instant messaging system;
    extract, from each of the one or more messages, data representing a type of user activity associated with the at least one of the one or more contacts; and
    update the contacts region of the user interface based, at least in part, on each extracted type of user activity.

10. The computer-readable storage memory of claim 9, wherein the computer-readable instructions are further configured to:
    for each extracted type of user activity:
        determine a contact from the one more contacts that is associated with said extracted type of user activity; and
        update a region in the contacts region that is associated with said contact with an indication of said extracted type user activity.

11. The computer-readable storage memory of claim 10, wherein the computer-readable instructions are further configured to receive at least two messages associated with the instant messaging system, wherein each message is associated with a different contact.

12. The computer-readable storage memory of claim 9, wherein the predetermined set of user activities further comprises:
   a typing activity;
   an angry user activity; and
   a message canceled activity.

13. The computer-readable storage memory of claim 12, wherein the user interface is further configured to display a unique indicator for each activity of the predetermined set of user activities.

14. The computer-readable storage memory of claim 13, wherein each unique indicator comprises an icon.

15. The computer-readable storage memory of claim 8, wherein the user interface is further configured to:
   display an avatar for at least some contacts of the one or more contacts;
   display a user name for at least some contacts of the one or more contact; and
   display a presence indicator for at least some contacts of the one or more contacts.

16. The computer-readable storage memory of claim 10, wherein the computer-readable instructions are further configured to:
   update the region in the contacts region that is associated with said contact by replacing an existing indication with a new indication;
   update the region in the contacts region that is associated with said contact by removing an existing indication responsive to identifying the type of user activity as a user inactivity notification; and
   update the region in the contacts region that is associated with said contact by maintaining an existing indication.

17. The one or more computer-readable storage memory of claim 8, wherein the instant messaging system is configured to connect to one or more contacts over a communications network.

18. A system comprising:
   at least one processor;
   computer-readable storage memory embodying one or more computer executable instructions which, responsive to execution by the at least one processor, implement an instant messaging system configured to:
   monitor an input region of a user interface;
   receive input via said input region;
   responsive to receiving the user activated input, analyze the input received via said input region to identify a type of user activity from a predetermined set of user activities, wherein the predetermined set of user activities comprises at least a deletion activity, an accidental input activity, and a message completed activity; and
   transmit a message comprising data representing the identified type of user activity over a communications network.

19. The system as recited in claim 17, wherein the instant messaging system is further configured to:
   receive at least one message over the communication network;
   extract from the at least one message data representing a type of user activity; and
   update an activity indicator on the user interface based, at least in part, on the extracted type of user activity.

20. The system as recited in claim 18, wherein the user interface is further configured to display:
   a contacts region configured to display one or more contacts associated with at least one conversation associated with the instant messaging system, wherein the activity indicator is displayed in the contacts region; and
   a message region, the message region configured to display one or more previous messages exchanged between the one or more contacts in the at least one conversation.

* * * * *